(12) United States Patent
Nakamura et al.

(10) Patent No.: US 6,569,267 B1
(45) Date of Patent: May 27, 2003

(54) HIGH BEARING PRESSURE-RESISTANT MEMBER

(75) Inventors: Tsuyoshi Nakamura, Aichi (JP); Sadayuki Nakamura, Mie (JP); Toshimitsu Kimura, Nagoya (JP); Takurou Yamaguchi, Kanagawa (JP); Keizo Otani, Kanagawa (JP); Noriko Uchiyama, Kanagawa (JP); Nobuo Kino, Kanagawa (JP); Toshikazu Nanbu, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/620,996

(22) Filed: Jul. 20, 2000

(30) Foreign Application Priority Data

Jul. 21, 1999 (JP) .......................................... 11-206552
Jul. 23, 1999 (JP) .......................................... 11-208958
Jul. 6, 2000 (JP) ...................................... 2000-204798

(51) Int. Cl.$^7$ .............................................. C22C 38/22
(52) U.S. Cl. ....................................... 148/328; 148/334
(58) Field of Search ................................ 148/233, 328, 148/333, 334

(56) References Cited

U.S. PATENT DOCUMENTS

| | | | | |
|---|---|---|---|---|
| 4,913,749 A | * | 4/1990 | Hengerer et al. | 148/233 |
| 4,971,634 A | * | 11/1990 | Shibata et al. | 148/218 |
| 5,660,647 A | * | 8/1997 | Mitamura et al. | 148/319 |
| 5,976,277 A | * | 11/1999 | Park et al. | 148/543 |
| 6,086,686 A | * | 7/2000 | Tanaka et al. | 148/325 |
| 2001/0001396 A1 | * | 5/2001 | Takayama et al. | 148/230 |

OTHER PUBLICATIONS

Academic Press Dictionary of Science and Technology, "shot peening", accessed Nov. 21, 2001, http://www.harcourt.com/dictionary/def/9/3/0/8/9308200.html.*
"JIS G 4105", Japanese Standards Association, 1979.*
Japanese Industrial Standard (JIS G 4052, 1979), " Structural Steels with Specified Hardenability Bands.", pp. 1–36.
Aerospace Material Specification (AMS 649OD, 1989), "Steel Bars, Forgings, and Tubing.", pp. 1–9.
Japanese Industrial Standard (JIS G 4104, 1979), " Chromium Steels.", pp. 1–9.
Japanese Industrial Standard (JIS G 4105, 1979), " Chromium Molybdenum Steels.", pp. 1–11.
Japanese Industrial Standard (JIS G 4103, 1979), " Nickel Chromium Molybdenium Steels.", pp. 1–10.
American Society for Testing and Materials, (ASTM) A 387/A 387M–99, "Standard Specification for Pressure Vessel Plates, Alloy Steel, Chromium–Molybdenum[1].", pp. 1–5.
Japanese Industrial Standard (JIS G 4805, 1999), " High carbon chromium bearing steels.", pp. 1–31.

* cited by examiner

Primary Examiner—Roy King
Assistant Examiner—Harry D Wilkins, III
(74) Attorney, Agent, or Firm—Foley & Lardner

(57) ABSTRACT

A high bearing pressure-resistant member used as a rolling element forming part of a toroidal continuously variable transmission for an automotive vehicle. The high bearing pressure-resistant member is formed of a mechanical structural steel containing Cr. The mechanical structural steel includes a matrix having at least one of martensite structure and bainite structure. The matrix contains carbide having a mean particle size of 3 $\mu$m or less, dispersed and precipitated in form of at least one of generally spheres and pseudo-spheres.

19 Claims, 13 Drawing Sheets

HIGH BEARING PRESSURE-RESISTANT MEMBER

BACKGROUND OF THE INVENTION

This invention relates to a member applied as a motive power transmission part requiring a high degree of surface fatigue strength in the manner of gears and bearing rolling elements, and more particularly, to a high bearing pressure-resistant member and a production process of such a high bearing pressure-resistant member that is suitable for use under high bearing pressure in semi-high-temperature to high-temperature environments (of roughly within a range of from 100 to 300° C.).

A motive power transmission part of the prior art like that described above is used after subjecting to surface hardening treatment such as carburization and carbonitriding having for its base material (matrix) mechanical structure steel represented by SCr420H steel (chromium steel) and SCM420H steel (chromium-molybdenum steel) defined in JIS G 4052 (structural steel materials having guaranteed quenching).

However, accompanying the higher engine outputs and reduced size and weight of parts used in, for example, automobiles in recent years, the loads being applied to motive power transmission parts is tending to increase, and there are a growing number of cases of use under semi-high to high temperatures (roughly 300° or lower) and under high bearing pressure.

Although there is, for example, the method of high-density carburization treatment, which improves temper softening resistance as a result of increasing hardness by aggressive precipitation of $Fe_3C$ (cementite), as a method of increasing surface fatigue strength of such parts, cementite is susceptible to precipitation in the form of a coarse reticular form along the grain boundary during carburization, and the coarse carbide (cementite) precipitated in reticular form near the grain boundary results in quench cracking that not only lowers tenacity, but also decreases rolling fatigue strength.

On the other hand, there are also methods of precipitating carbide using steels containing Cr, Mo, V or W as in AMS64900 used at semi-high to high-temperature ranges. Although these methods result in improvement of pitting resistance and rolling fatigue service life at semi-high to high-temperature ranges, since these steels contain large amounts of alloy elements, in addition to the cost of the base material (matrix) becoming high, there are also problems including decreased ease of cutting, and the resolution of such problems has been a topic for high bearing pressure members of the prior art.

SUMMARY OF THE INVENTION

It is an object of the present invention to provide an improved high bearing pressure-resistant member and a process of producing the same member, which can effectively overcome drawbacks encountered in conventional similar techniques.

Another object of the present invention is to provide an improved high bearing pressure-resistant member and a process of producing the same member, which high bearing pressure-resistant member has excellent surface fatigue strength such as pitting strength and rolling fatigue strength even under semi-high to high temperatures and high bearing pressure such that local bearing pressure exceeds 3 GPa, while also inhibiting increases in base material cost and decreases in cutting ease caused by the addition of large amounts of alloy elements in comparison with AMS64900 of the prior art, and not requiring complex heat treatment.

An aspect of the present invention resides in a high bearing pressure-resistant member which is formed of a mechanical structural steel containing Cr. The mechanical structural steel includes a matrix having at least one of martensite structure and bainite structure. The matrix contains carbide having a mean particle size of 3 $\mu$m or less, dispersed and precipitated in form of at least one of generally spheres and pseudo-spheres.

Another aspect of the present invention resides in a process of producing a high bearing pressure-resistant member.

The production process comprises (a) performing carburization treatment on a material member formed of a mechanical structural steel containing Cr so that the material member has a surface carbon density within a range of from 0.6 to 1.5% by weight; (b) precipitating carbide by holding the carburized material member at a temperature having an upper limit temperature T (° C.) which is calculated from an equation: T=675+120·Si(wt %)−27·Ni(wt %)+30·Cr(wt %)+215·Mo(wt %)−400·V(wt %); and (c) quenching the carbide-precipitated material member by rapidly cooling the carbide-precipitated member after holding the carbide-precipitated member at a temperature at which austenite phase is formed.

A further aspect of the present invention resides in a process of producing a high bearing pressure-resistant member. The production process comprises (a) performing a carburization treatment on a material member formed of a mechanical structural steel containing Cr so that a surface carbon density of the mechanical structural member is within a range of from 0.6 to 1.5% by weight; (b) precipitating carbide by holding the carburized material member at a precipitation temperature Tp (° C.) having an upper limit temperature T (° C.) calculated according to a first equation: T=675+120·Si(%)−27·Ni(%)+30·Cr(%)+215·Mo(%)−400·V(%) based components of the material member for a time shorter than a time t (hr.) calculated according to a second equation: $t=10^{\{19000/(Tp+273)-20\}}$ based on the precipitation temperature Tp (° C.); and (c) quenching the carbide-precipitated material member by rapidly cooling the carbide-precipitated member after holding the carbide-precipitated material member at at least one of a $Ac_1$ transformation temperature and a temperature (austenite region temperature) at which austenite phase is formed.

DETAILED DESCRIPTION OF THE INVENTION

Figure 1:
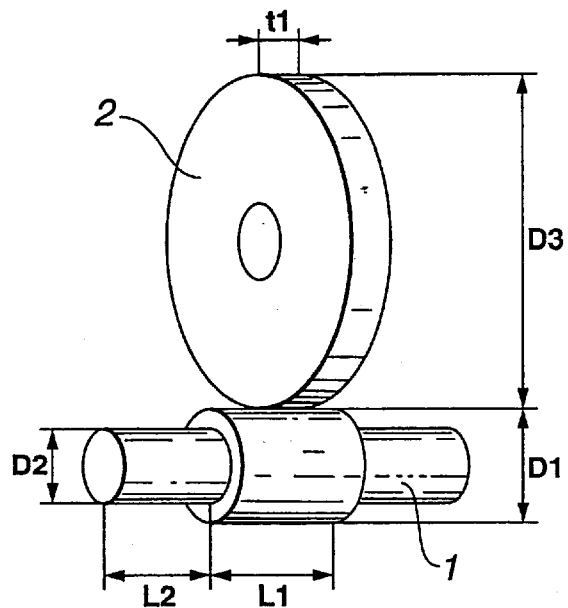
FIG. 1 is a schematic fragmentary perspective view showing the manner of a roller pitting test and the shape of a test piece applied in an embodiment of the present invention.

Referring now to FIGS. 1 through 8B, first mode of the high bearing pressure-resistant member according to the present invention will be discussed.

According to the present invention, a high bearing pressure-resistant member is formed of a mechanical structural steel containing Cr. The mechanical structural steel includes a matrix having at least one of martensite structure and bainite structure. The matrix contains carbide having a mean particle size of 3 $\mu$m or less, dispersed and precipitated in form of at least one of generally spheres and pseudo-spheres. The carbide includes $M_{23}C_6$-type carbide where M is a metal element. The form of spheres means generally spherical shapes, and the form of pseudo-spheres means deformed spherical shapes.

The high bearing pressure-resistant member can secure a high degree of hardness even at semi-high to high temperatures (generally 100 to 300° C.) and has excellent surface fatigue strength even under high bearing pressure such as local bearing pressure exceeds 3 GPa. Furthermore, in the present invention, although the Cr is an alloy component that is required as an element that forms the carbide, and particular $M_{23}C_6$-type carbide, it is only required to be added at 1–4%, and does not cause an increase in the cost of the base material (matrix) or a decrease in cutting ease.

Furthermore, examples of steels containing Cr that can be used include, according to JIS, chromium steel (SCr series) defined in G 4104, chromium-molybdenum steel (SCM series) defined in G 4105, and nickel-chromium-molybdenum steel (SNCM series) defined in G 4103. In addition, examples of steels according to ASTM include A387Gr11, Gr21 and Gr22 steels. Such steels serve as raw material (or material member) for the high bearing pressure-resistant member according to the present invention.

The high bearing pressure-resistant member is formed by dispersing and precipitating microcarbides having a mean particle size of 3 $\mu$m or less in the form of spheres or pseudo-spheres in a base (matrix) of martensite or bainite mechanical structural steel containing 1.2–3.2% Cr and 0.25–2.0% Mo, and therefore has excellent surface fatigue strength even under the semi-high to high temperatures. Furthermore, although the Cr in the present invention is an alloy component that is required as an element that forms the carbide, and particular $M_{23}C_6$-type carbide, it is only required to be added within the above range, and does not cause an increase in the cost of the base material (matrix) or a decrease in cutting ease. It will be understood that "%" used in this specification is "% by weight" except for that of area ratio (rate). If the amount of this Cr is less than 1.2%, the amount of carbide precipitated decreases thereby preventing the expected rolling fatigue service life from being obtained. On the other hand, if the amount of this Cr exceeds 3.2%, there is the risk of a decrease in cutting ease. In addition, addition of Mo simultaneous to addition of Cr results in stable precipitation of $M_{23}C_6$-type carbide. If the amount of Mo is less than 0.25%, the effect of stabilizing precipitation cannot be expected. If the amount of Mo exceeds 2% however, cutting ease decreases.

In the high bearing pressure-resistant member of the present invention, since its S content is 0.01% or less, although MnS-based inclusions are reduced and machinability decreases, a stable long service life is obtained. If the amount of S exceeds 0.01%, while MnS-based inclusions facilitate cutting, the probability of the occurrence of internal origin separation starting at MnS-based inclusions under rolling contact increases, making it difficult to obtain a stable service life.

In the high bearing pressure-resistant member of the present invention, since the amount of nitrogen solid solution at least at the location from the surface to the surface formed after grinding is within a range of from 0.01 to 0.5%, and solid solutions of nitrogen have the effect of spreading Acm lines into high carbon regions, the precipitation of reticular carbide is prevented by adding at 0.01% or more. However, if the amount of nitrogen solid solution exceeds 0.5%, the amount of nitrogen solid solution in the matrix increases and tends to decrease the amount of precipitation of $M_{23}C_6$-type carbide.

Since the high bearing pressure-resistant member of the present invention contains $M_{23}C_6$-type carbide as the carbide, this carbide is dispersed extremely finely in martensite or bainite structures, is resistant to sources of stress concentration, is not softened even under the semi-high to high temperatures, and maintains a high degree of hardness.

In addition, in the high bearing pressure-resistant member as claimed in claim 6, since carbide at a surface area ratio (rate)ranging from 0.3 to 30% is dispersed and precipitated at a location at least from the surface susceptible to the occurrence of internal separation to the depth of occurrence of maximum shearing stress caused by rolling contact, it has excellent surface fatigue strength such as pitting strength and rolling fatigue strength. Furthermore, when the precipitated surface area of carbide at this time does not reach 0.3%, there is no improvement in cold hardness or temper hardness and adequate pitting strength and rolling fatigue strength are unable to be obtained. When the precipitated surface area of carbide exceeds 30%, in addition to tenacity decreasing, there is a shortage of alloy elements in the matrix due to alloy elements going into solid solution in the carbide, resulting in the tendency to locally form a soft layer.

The high bearing pressure-resistant member of the present invention demonstrates its characteristics particularly by being applied to motive force transmission parts requiring surface fatigue strength under high bearing pressure, and rolling elements for toroidal continuously variable transmissions requiring rolling fatigue strength under high bearing pressure, and contributes to reduced size and improved longevity of the apparatus in which it is applied.

The following production process of a high bearing pressure-resistant member of the present invention is suitable for the production of the above high bearing pressure-resistant member. The production process comprises (a) performing carburization treatment on a material member formed of a mechanical structural steel containing Cr so that the material member has a surface carbon density within a range of from 0.6 to 1.5% by weight; (b) precipitating carbide by holding the carburized material member at a temperature having an upper limit temperature T (° C.) which is calculated from an equation: T=675+120·Si(wt %)−27·Ni(wt %)+30·Cr(wt %)+215·Mo(wt %)−400·V(wt %); and (c) quenching the carbide-precipitated material member by rapidly cooling the carbide-precipitated member after holding the carbide-precipitated member at a temperature at which austenite phase is formed. Consequently, this production process inhibits the precipitation of coarse, reticular $M_3C$-type carbide in the surface portion that includes the location of maximum shearing stress depth caused by rolling contact, allows the precipitation of fine $M_{23}C_6$-type carbide that is stable even at semi-high to high temperatures, and allows the matrix after quenching to have a martensite or bainite structure. As a result, a high bearing pressure-resistant member is obtained that secures high hardness even at the semi-high to high temperatures, and has excellent surface fatigue strength such as pitting strength and rolling fatigue strength even under high bearing pressure such that local bearing pressure exceeds 3 GPa.

At this time, in the case the surface carbon density of the carburized layer is less than 0.6%, it is not possible to secure hardness. Conversely, in the case the surface carbon density exceeds 1.5%, there is increased susceptibility to precipitation of $M_3C$-type carbide, and there is reticular growth at a mean particle size that exceeds 3 μm thereby making this undesirable. Furthermore, there are no particular restrictions on the method of carburization treatment, and although methods such as solid carburization, liquid carburization or gas carburization can be used, it is preferable to employ vacuum carburization or plasma carburization if possible. This is because, since vacuum carburization and plasma carburization are vacuum treatments, a grain boundary oxidation layer is not formed on the surface and there are no decreases near the surface in the densities of carbide forming elements such as Cr, thus allowing carbide to be formed down to the surface and making it difficult during treatment to form a Cr-based oxide film on the surface that inhibits carburization.

As is previously described, although the Cr in the raw material steel in the present invention is an essential alloy component that forms carbide, and particularly $M_{23}C_6$-type carbide, its amount added is preferably about 1 to 4% from the viewpoint of ensuring its action while avoiding increases in cost and decreased cutting ease.

The above equation T that is used to calculate the upper limit value of the holding temperature for precipitating carbide was determined as a result of numerous experiments, and by holding the member after carburization treatment equal to or below temperature T (° C.) calculated according to its alloy components, $M_{23}C_6$-type carbide is precipitated. Since the mean particle size of $M_{23}C_6$-type carbide is extremely minute at 1 μm or less, it is unlikely to be a source of stress concentration. Since it is also dispersed and precipitated within crystal grains of martensite or bainite, it is resistant to softening at the semi-high and high temperatures, thereby ensuring high hardness. It is not always necessary to hold until equilibrium with respect to the carbide precipitation treatment time, namely the holding time at temperature T, and this time is selected to be within the range of about 10 minutes to 10 hours. In addition, it is preferable that the lower limit temperature of carbide precipitation treatment be 500° C. or higher from the viewpoint of productivity.

At this time, if carbide precipitation treatment is performed at a temperature higher than temperature T (° C.) calculated according to the alloy components, $M_{23}C_6$-type carbide is not precipitated and a solid solution structure results that prevents the obtaining of hardness. Consequently, pitting strength and rolling fatigue strength become inadequate.

If the holding time at the austenite region temperature in the quenching step is too long, precipitated carbide ends up returning to a solid solution in the carbide precipitation step. Consequently, a holding time from about 30 minutes to 2 hours is suitable, and it is preferable that treatment beyond 2 hours be avoided.

Since the following production process of a high bearing pressure-resistant member of the present invention is also suitable for production of the above high bearing pressure-resistant member of the present invention. The production process consisting mainly of a carburization step, carbide precipitation step and quenching step, wherein carburization treatment is performed on a member comprising mechanical structural steel containing 1.2 to 3.2% of Cr and 0.25 2.0% of Mo, carburization treatment is performed such that the surface carbon density is within a range of from 0.6 to 1.5% and the carbon density at the depth location of occurrence of the maximum shearing stress caused by rolling contact is within the range of 0.5% or more, carbide is precipitated while holding the carburized member at a temperature having for its upper limit temperature T (° C.) as calculated from the above equation, and quenching is performed after holding at the austenite region temperature. Accordingly, the precipitation of coarse, reticular $M_3C$-type carbide at the surface layer portion that includes the depth location of maximum shearing stress caused by rolling contact is inhibited, microscopic $M_{23}C_6$-type carbide that is stable even at semi-high and high temperatures is precipitated, and the matrix after quenching becomes a martensite or bainite structure, thereby allowing the obtaining of a high bearing pressure-resistant member that secures high hardness even at the semi-high to high temperatures, and has excellent surface fatigue strength such as pitting strength and rolling fatigue strength even under high bearing pressure such that local bearing pressure exceeds 3 GPa.

Here, in the case the surface carbon density of the carburized layer is less than 0.6%, hardness can similarly not be secured, and conversely if the surface carbon density exceeds 1.5%, there is increased susceptibility to precipitation of $M_3C$-type carbide that grows in a reticular form having a mean particle size in excess of 3 μm, thereby making this undesirable. In addition, in the case the carbon density at the depth location of maximum shearing stress caused by rolling contact is less than 0.5%, the carbide surface area ratio (rate) at this depth location (or surface area ratio of the precipitated carbide at the location of a depth of 0.1 mm, as discussed after) is unable to reach 0.3%, thereby failing to improve cold hardness or temper hardness and preventing the obtaining of adequate pitting strength and rolling fatigue strength. Furthermore, there are no particular restrictions on the carburization treatment method and although methods such as solid carburization, liquid carburization or gas carburization can be used, it is preferable to employ vacuum carburization or plasma carburization if possible.

Although the Cr in the raw material steel in the present invention is an essential alloy component that forms carbide, and particularly $M_{23}C_6$-type carbide, as is previously mentioned, its amount added is preferably about 1.2–3.2% from the viewpoint of ensuring its action while avoiding increases in cost and decreased cutting ease. Although Mo is added since addition simultaneous to Cr allows stable precipitation of $M_{23}C_6$-type carbide, if the amount of Mo added is less than 0.25%, stable precipitation of $M_{23}C_6$-type carbide cannot be expected, and if the amount added exceeds 2%, cutting ease tends to decrease.

In the production process of a high bearing pressure-resistant member of the present invention, since conditions are used such that the ratio (Td/Tc) of diffusion temperature Td (° C.) following carburization to carburization temperature Tc (° C.) when carburization treatment is performed by vacuum carburization or plasma carburization is within the range of from 1.05 to 1.25, reticular carbide precipitated at the grain boundary during carburization disappears easily. It will be understood that diffusion of carbon is accomplished at the diffusion temperature, while carburization is accomplished at the carburization temperature. At this time, in the case the ratio of Td/Tc does not reach 1.05, it become difficult to obtain this effect. In addition, the higher the temperature of diffusion, the larger the diffusion coefficient of carbon inside, and although this facilitates the disappearance of reticular carbide, if the ratio of Td/Tc exceeds 1.25, since there is melting of the steel surface, it is preferable that the upper limit of this ratio be 1.25.

On the other hand, if the cooling rate until the carbide precipitation step following carburization diffusion is too slow, since supersaturated carbon is likely to be precipitated in reticular form at the grain boundary, it is preferable that the cooling rate at this time be 10° C./minute or more. Preferable methods for achieving a cooling rate of 10° C./minute or more include gas cooling to the carbide precipitation temperature in a carburization diffusion chamber, transferring to a cooling chamber outside the carburization diffusion chamber and lowering to the carbide precipitation temperature, and temporarily quenching after carburization diffusion followed by heating to the carbide precipitation temperature.

Moreover, in the production process of a high bearing pressure-resistant member, in addition to the above steps, since nitriding is performed either simultaneous to carburization (carburization nitriding) or following completion of carburization, precipitation of reticular carbide is prevented by nitrogen in solid solution.

The following production process of a high bearing pressure-resistant member of the present invention is provided consisting of precipitating carbide while holding a member composed of mechanical structural steel containing Cr and 0.6–1.5% carbon at a temperature having for its upper limit temperature T (° C.) calculated from the above equation, followed by performing quenching after holding at the austenite region temperature. Accordingly, precipitation of coarse, reticular $M_3C$-type carbide (cementite) at the surface layer portion that contains the depth location of maximum shearing stress caused by rolling contact is inhibited, microscopic $M_{23}C_6$-type carbide that is stable even at semi-high to high temperatures (300° C. or less) is precipitated and the matrix becomes a martensite structure, thereby allowing the obtaining of a high bearing pressure-resistant member that secures high strength even at the semi-high to high temperatures and has excellent surface fatigue strength such as pitting strength and rolling fatigue strength even under high bearing pressure such that local bearing pressure exceeds 3 GPa, while also realizing low production cost as a result of not requiring a carburization step.

Additionally, the following production process of a high bearing pressure-resistant member of the present invention is provided consisting of precipitating carbide by holding a member composed of mechanical structural steel containing 1.2 to 3.2% of Cr, 0.25 to 2.0% of Mo and 0.6 to 1.5% of C at a temperature having for its upper limit temperature T (° C.) calculated from the above equation and quenching by cooling rapidly after holding at the austenite region temperature. Accordingly, a carburization step is similarly not required, precipitation of coarse, reticular $M_3C$-type carbide at the surface layer portion that contains the depth location of maximum shearing stress caused by rolling contact is similarly inhibited, microscopic $M_{23}C_6$-type carbide that is stable even at the semi-high to high temperatures (300° C. or less) is precipitated and the matrix becomes a martensite or bainite structure, thereby allowing the obtaining of a high bearing pressure-resistant member that secures high hardness and has excellent surface fatigue strength such as pitting strength and rolling fatigue strength even under high bearing pressure such that local bearing pressure exceeds 3 GPa.

In the production process of a high bearing pressure-resistant member, since nitriding is performed on the member prior to the carbide precipitation step, precipitation of reticular carbide on the member surface is inhibited by nitride in solid solution. Additionally, in the production process of a high bearing pressure-resistant member, since holding at the austenite region temperature prior to quenching is performed simultaneous to the carbide precipitation step, this step can be simplified in the case the austenite region temperature coincides with the carbide precipitation temperature, thereby enabling cost to be reduced.

EMBODIMENTS

The following provides a detailed explanation of the present invention based on its embodiments.

Embodiment 1

Figure 2:
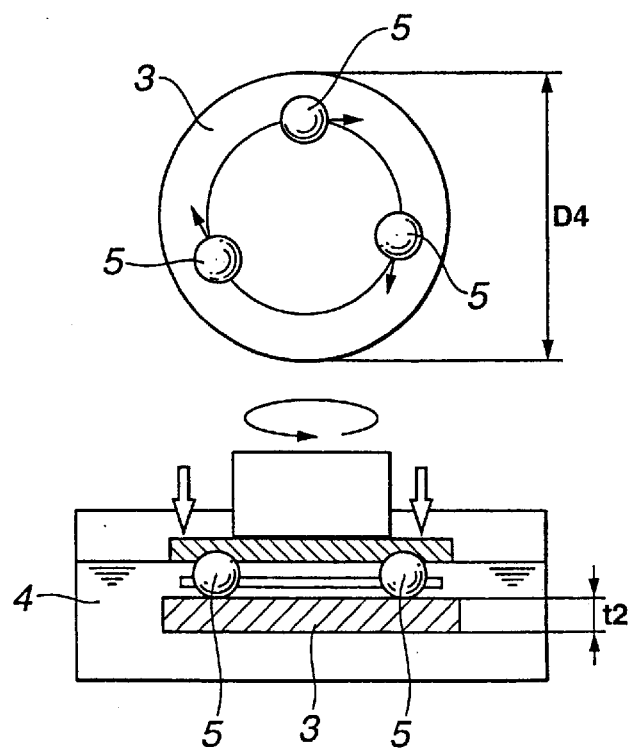
FIG. 2 is a schematic illustration showing the outline of the thrust-type rolling fatigue test and the shape of the test piece applied in the embodiment of the present invention.

Small roller test piece 1 for roller pitting testing as shown in FIG. 1 (diameter of large diameter portion D1=26 mm, length of large diameter portion L1=28 mm, diameter of small diameter portion D2=24 mm and length of small diameter portion L2=51 mm), and disk-shaped test piece 3 for thrust-type rolling fatigue testing as shown in FIG. 2 (diameter D4=60 mm, thickness t2=5 mm) were cut out using mechanical structural steel of each of the compositions shown in Table 1. Then, after performing carburization or carbonitriding, carbide precipitation treatment, quenching and tempering according to either of the conditions shown in FIGS. 3A through 6N, the surface of each test piece was finished by grinding. Plasma carburization was used for the carburization method at this time.

TABLE 1

| Type of Steel | Chemical Composition (wt %) | | | | | | | | | T* |
|---|---|---|---|---|---|---|---|---|---|---|
| | C | Si | Mn | S | Ni | Cr | Mo | V | O | |
| A | 0.20 | 1.00 | 0.30 | 0.005 | 2.0 | 1.50 | 1.50 | 0.19 | Max. 12 ppm | 1032.5 |
| B | 0.24 | 1.01 | 0.35 | 0.004 | 1.9 | 1.95 | 0.95 | 0.20 | Max. 12 ppm | 927.65 |
| C | 0.20 | 1.05 | 0.32 | 0.003 | 2.0 | 2.55 | 0.78 | 0.21 | Max. 12 ppm | 907.2 |
| D | 0.18 | 1.03 | 0.39 | 0.003 | 2.1 | 2.10 | 0.70 | 0.00 | Max. 12 ppm | 955.4 |
| E | 0.20 | 1.00 | 0.35 | 0.005 | 2.2 | 2.00 | 0.29 | 0.18 | Max. 12 ppm | 785.95 |
| F | 0.19 | 1.02 | 0.40 | 0.004 | 1.1 | 2.00 | 0.69 | 0.19 | Max. 12 ppm | 900.05 |
| G | 0.30 | 0.49 | 0.31 | 0.009 | 2.0 | 1.95 | 0.70 | 0.20 | Max. 12 ppm | 808.8 |
| H | 0.22 | 0.20 | 0.65 | 0.006 | 0.01 | 1.50 | 0.25 | 0.00 | Max. 12 ppm | 797.48 |
| I | 0.19 | 0.22 | 0.70 | 0.003 | 1.8 | 0.50 | 0.20 | 0.00 | Max. 12 ppm | 710.8 |
| J | 0.18 | 1.01 | 0.29 | 0.005 | 2.0 | 0.00 | 0.03 | 0.00 | Max. 12 ppm | 748.65 |
| K | 0.20 | 1.00 | 0.30 | 0.004 | 1.9 | 0.00 | 0.70 | 0.00 | Max. 12 ppm | 894.2 |
| L | 1.00 | 1.00 | 0.30 | 0.003 | 2.0 | 1.50 | 1.50 | 0.19 | Max. 12 ppm | 1032.5 |
| M | 1.30 | 1.01 | 0.35 | 0.004 | 1.9 | 1.95 | 0.95 | 0.20 | Max. 12 ppm | 927.65 |
| N | 1.50 | 0.49 | 0.31 | 0.003 | 2.0 | 1.95 | 0.70 | 0.20 | Max. 12 ppm | 808.8 |
| O | 0.80 | 0.50 | 0.31 | 0.005 | 2.1 | 2.10 | 1.60 | 0.19 | Max. 12 ppm | 1009.3 |
| P | 0.60 | 1.03 | 0.39 | 0.005 | 2.1 | 2.10 | 1.20 | 0.00 | Max. 12 ppm | 1062.9 |
| Q | 0.40 | 1.00 | 0.35 | 0.006 | 2.0 | 2.00 | 1.50 | 0.20 | Max. 12 ppm | 1043.5 |
| R | 1.80 | 1.10 | 0.40 | 0.003 | 1.9 | 2.10 | 1.40 | 0.20 | Max. 12 ppm | 1039.7 |
| S | 0.25 | 1.00 | 0.40 | 0.003 | 2 | 1.20 | 2.00 | 0.00 | Max. 12 ppm | 1207 |
| T | 0.20 | 1.10 | 0.30 | 0.004 | 1.8 | 3.20 | 1.60 | 0.00 | Max. 12 ppm | 1198.4 |
| V | 0.22 | 0.50 | 0.40 | 0.003 | 2 | 0.50 | 0.10 | 0.00 | Max. 12 ppm | 717.5 |
| W | 0.20 | 1.00 | 0.30 | 0.015 | 2 | 1.50 | 1.50 | 0.20 | Max. 12 ppm | 1028.5 |

*Note) T = 675 + 120·Si (%) − 27·Ni (%) + 30·Cr (%) + 215·Mo (%) − 400·V (%)

As shown in FIG. 1, a rolling pitting test was conducted under the conditions shown in Table 2 by combining small roller test piece 1 and disk-shaped partner material 2 (diameter D3=130 mm, thickness t1=18 mm) to determine roller pitting time or the number of repetitions or rotations (times) until pitting occurred.

TABLE 2

| Tester | Roller pitting tester |
|---|---|
| Bearing pressure | 3.2 GPa |
| Slip ratio | −40% |
| Rotating speed | 1500 rpm |
| Lubricating oil | Transmission oil |
| Oil temperature | 100° C. |
| Partner material | SUJ2, quenched, tempered |

Note)
a) Roller pitting tester was produced by Komatsu Engineering Corp.
b) "SUJ2" was high carbon chromium bearing steel according to JIS G 4805.
c) Slip ratio was a difference (%) of a rotational speed of the roller test piece 1 to that of the disk-shaped partner material 2.

In addition, with respect to the rolling fatigue test, disk-shaped test piece 3 and three spheres 5 as partner materials were combined in lubricating oil 4 using a thrust-type rolling fatigue tester as shown in FIG. 2, and thrust test life (L50) of disk-shaped test piece 3 was determined as follows: Five rolling fatigue tests were repeated to obtain test result of number (times) of turning of three spheres 5 along the periphery of disk-shaped test piece 3 at a time when separation or peeling occurred under the conditions shown in Table 3. Then five test results were plotted on a Wiebull probability paper, thereby determining the damage probability 50% life (L50) which was the life (the above turning number) until the separation or peeling occurred.

TABLE 3

| Tester | Thrust-type rolling fatigue tester |
|---|---|
| Bearing pressure | 5.23 GPa |
| Max. shearing stress depth | Location at 0.1 mm from surface |
| Rotating speed | 2000 rpm |
| Lubricating oil | Transmission oil |
| Oil temperature | 150° C. |
| Partner steel spheres | SUJ2, 3/8-inch diameter, 3 spheres |

Note)
Thrust-type rolling fatigue tester was produced by Japan Tobacco Inc.

Figure 11:
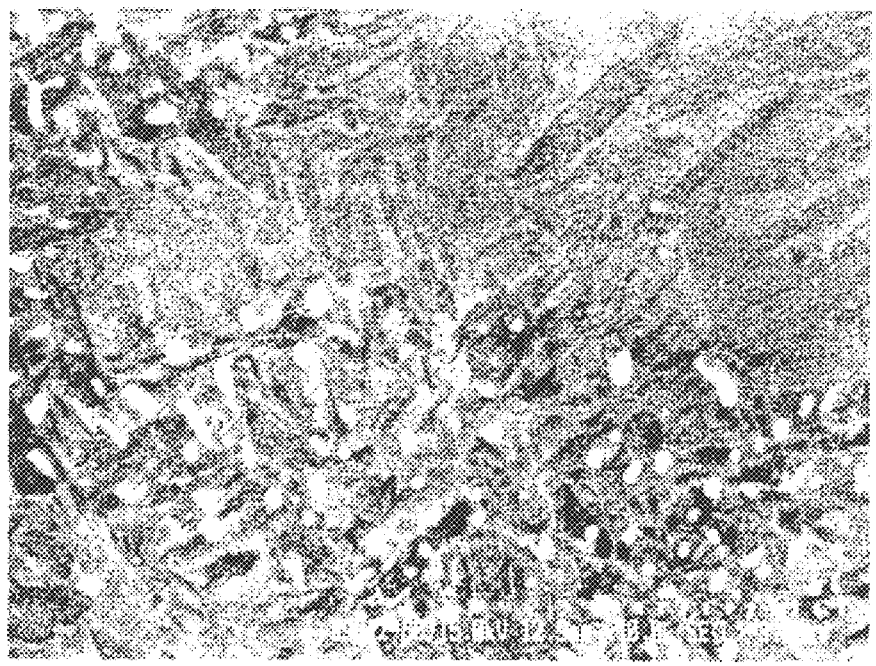
FIG. 11 is a microphotograph (by an electron microscope) of a microstructure of a thrust-type test piece of invention example 1 according to the present invention.
Figure 12:
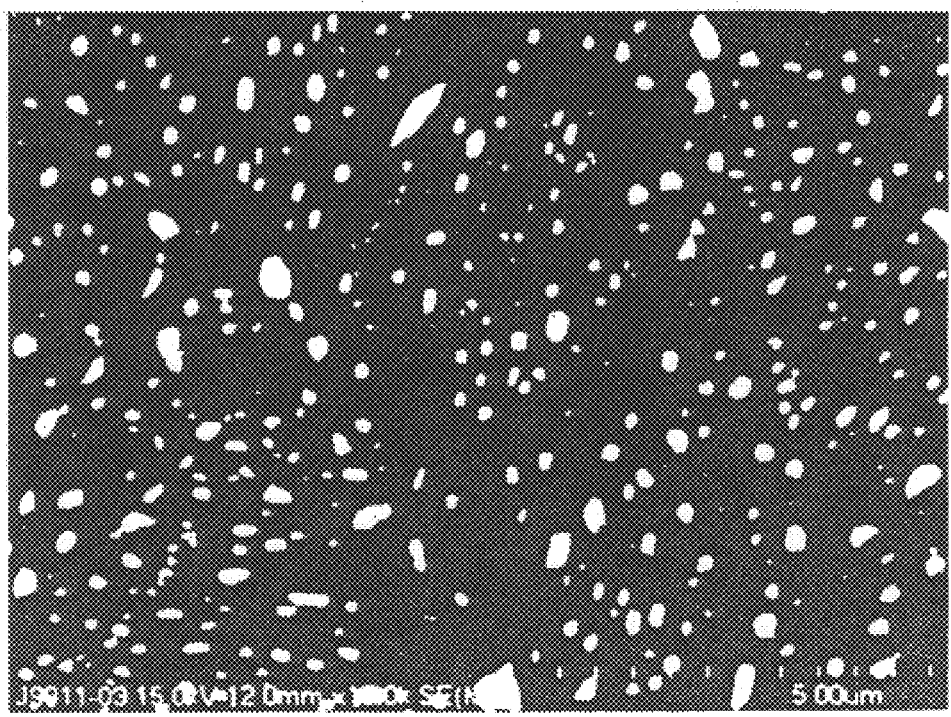
FIG. 12 is an image obtained by subjecting the microphotograph of FIG. 11 to image processing.

The cross-section of the thrust-type test piece obtained in the above manner was corroded with an alcohol solution containing 3% nitric acid, and after taking microphotographs at 10,000 magnifications of first cross-section of the test piece extending from the uppermost surface to a depth of 0.1 mm and of second cross-section (of the test piece) perpendicular to the first (vertical) cross-section by using a scanning electron microscope. As an example, the microphotograph of the microstructure of invention example 1 is shown in FIG. 11. The microphotograph of FIG. 11 was subjected to image processing thereby providing an image shown in FIG. 12. The second cross-section was located at a depth of 0.1 mm of the test piece. Thereafter, mean particle size of the precipitated carbide at the first cross-section and surface area ratio (rate) of the precipitated carbide at the second cross-section were measured using an image analyzer.

Cuttings from the uppermost surface of the test piece to a depth of 0.1 mm were sampled, and carbon density was measured according to the combustion method to determine the surface carbon density. Moreover, precipitation structure of the carbide was identified from electron beam diffraction patterns according to the replica method. In addition, the densities of carbon and nitrogen at the above-mentioned second cross-section located at a depth of 0.1 mm were also measured by using emission spectrochemical analysis.

In addition, together with measuring the distribution of hardness using a Vicker's hardness tester, the test piece was subjected to tempering treatment for 3 hours at 300° C. followed by measurement of hardness for the purpose of evaluating temper softening resistance.

These results are shown in Tables 4 and 5.

TABLE 4

Figure 3A:
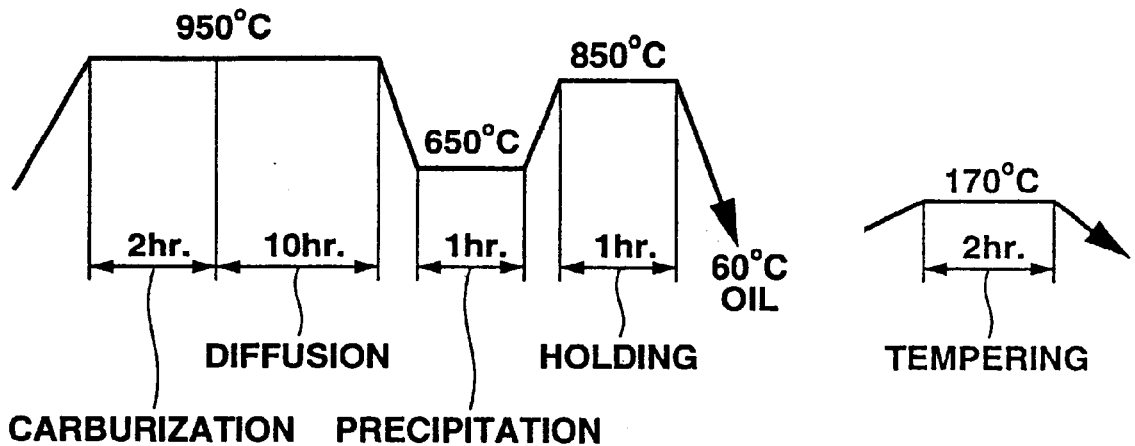
FIGS. 3A to 3D are graphical representations of heat treatment conditions applied in embodiments of the present invention.
Figure 3B:
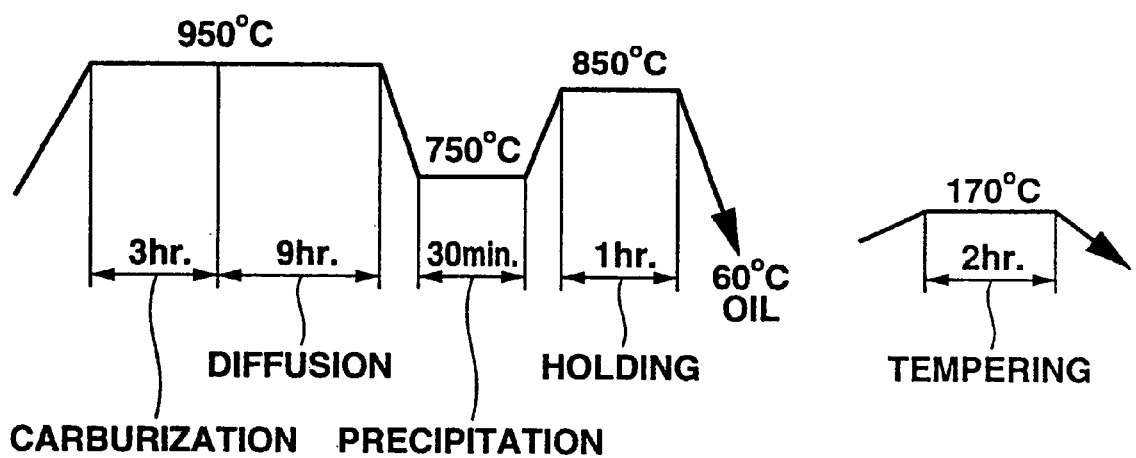
Figure 3C:
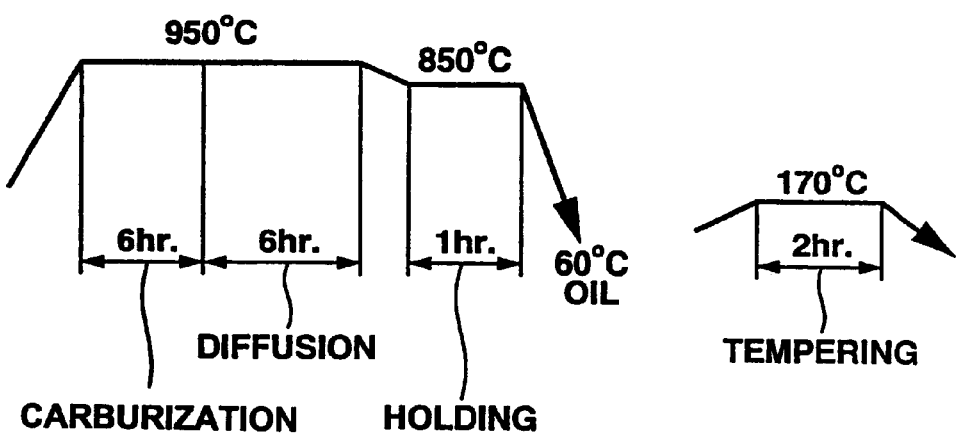
Figure 3D:
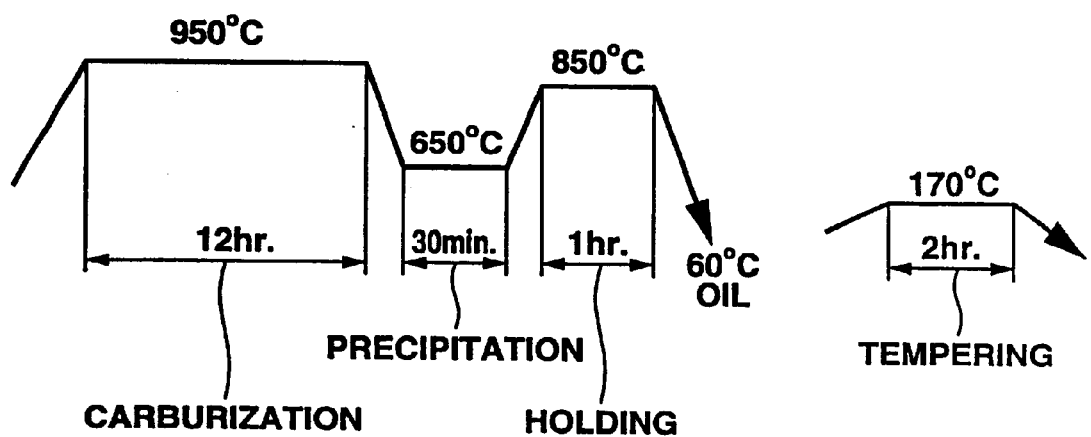
Figure 4E:
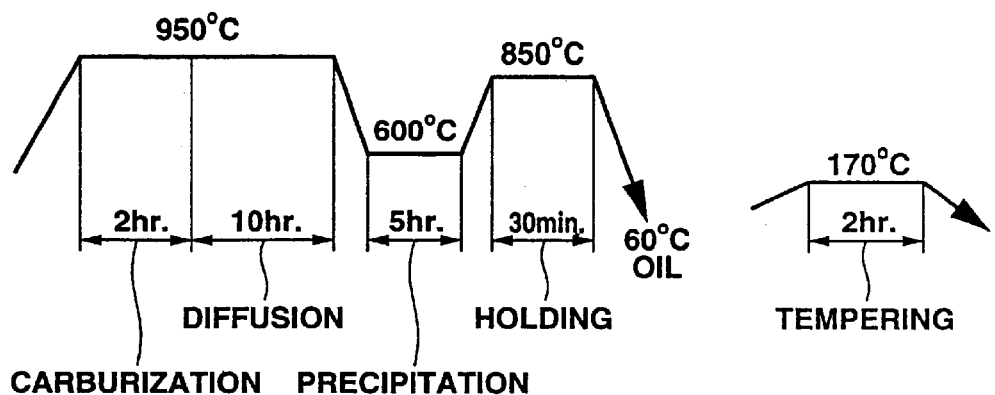
FIGS. 4E to 4G are graphical representations of heat treatment conditions applied in embodiments of the present invention.
Figure 4F:
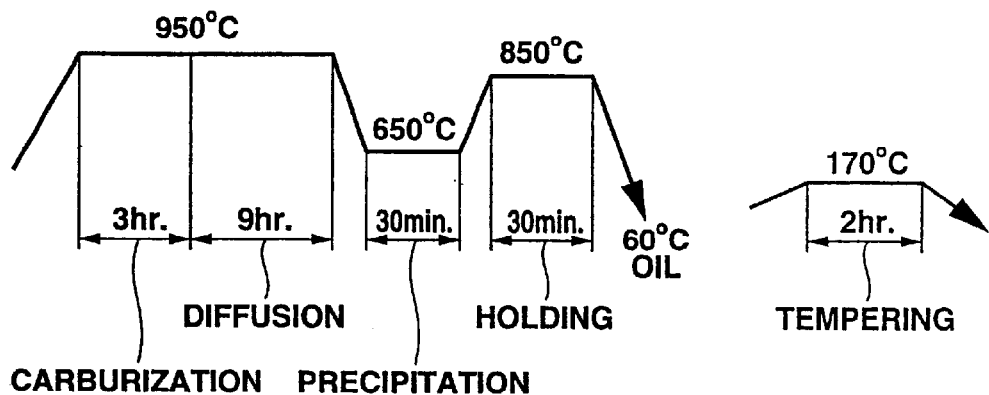
Figure 4G:
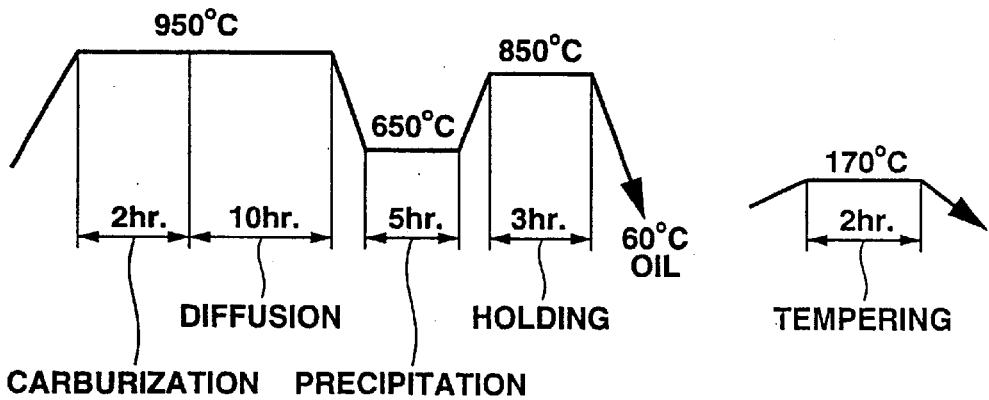
Figure 5H:
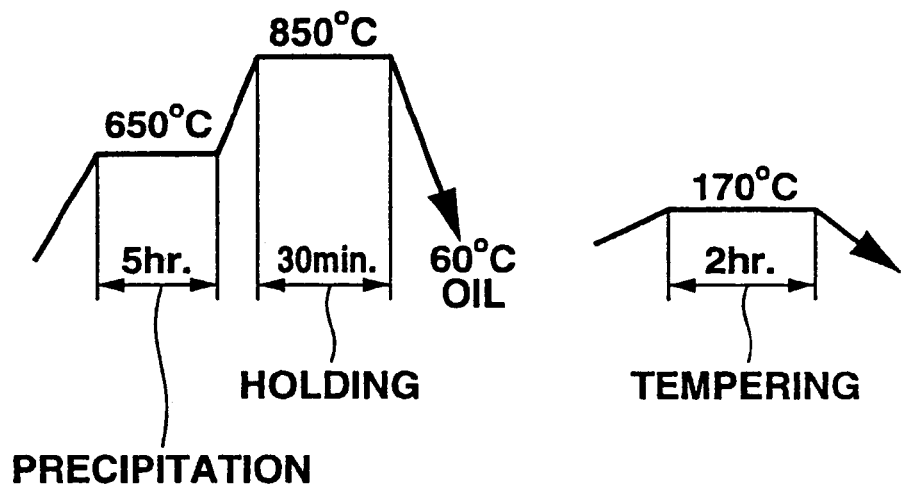
FIGS. 5H to 5K are graphical representations of heat treatment conditions applied in embodiments of the present invention.
Figure 5:
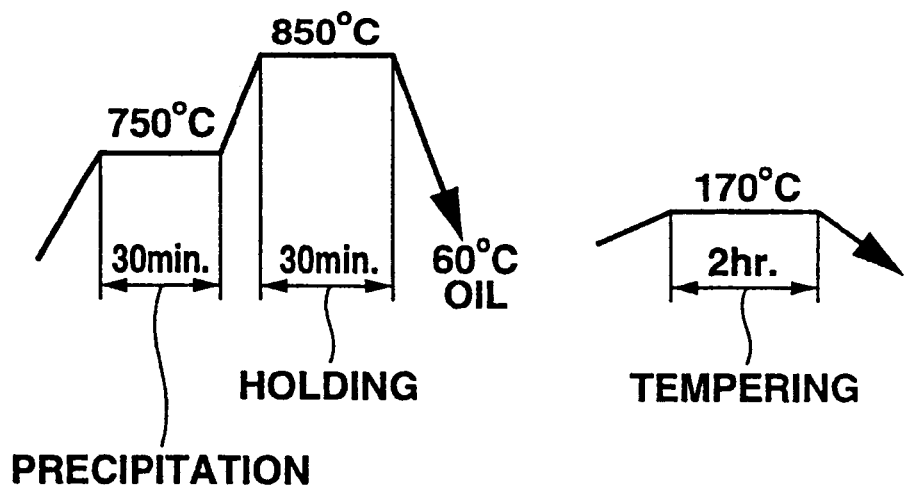
Figure 5J:
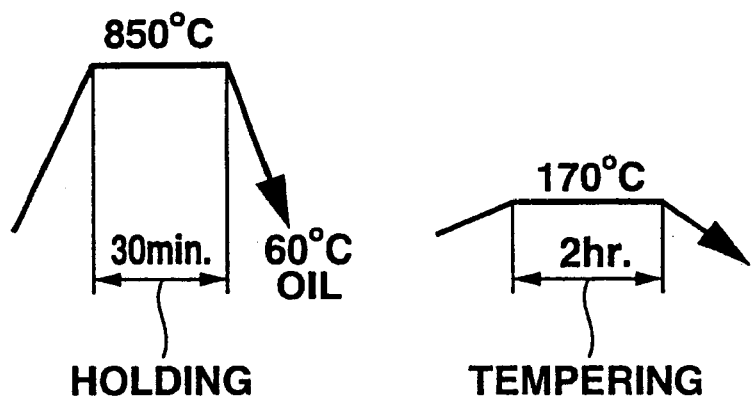
Figure 5K:
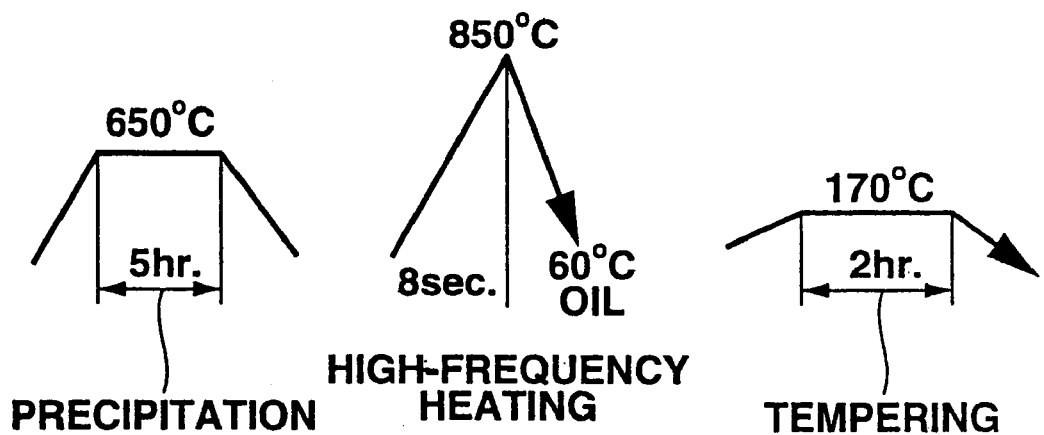
Figure 6L:
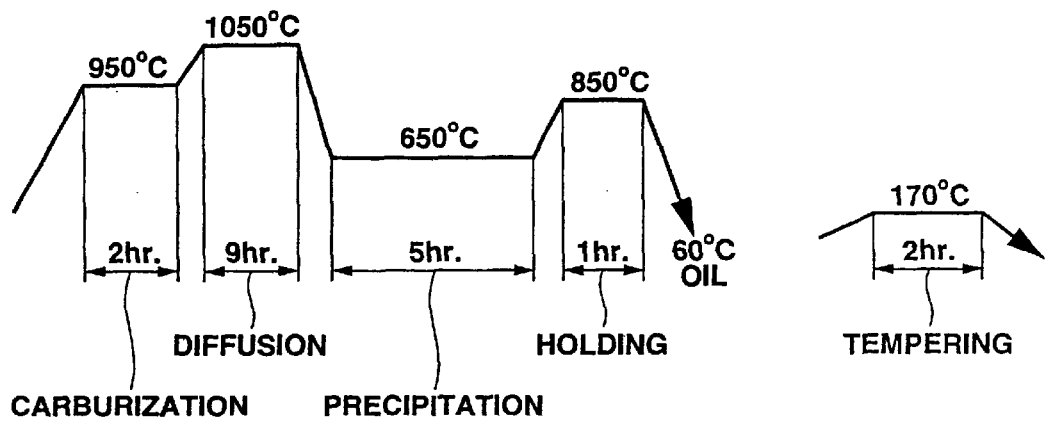
FIGS. 6L to 6N are graphical representations of heat treatment conditions applied in embodiments of the present invention.
Figure 6M:
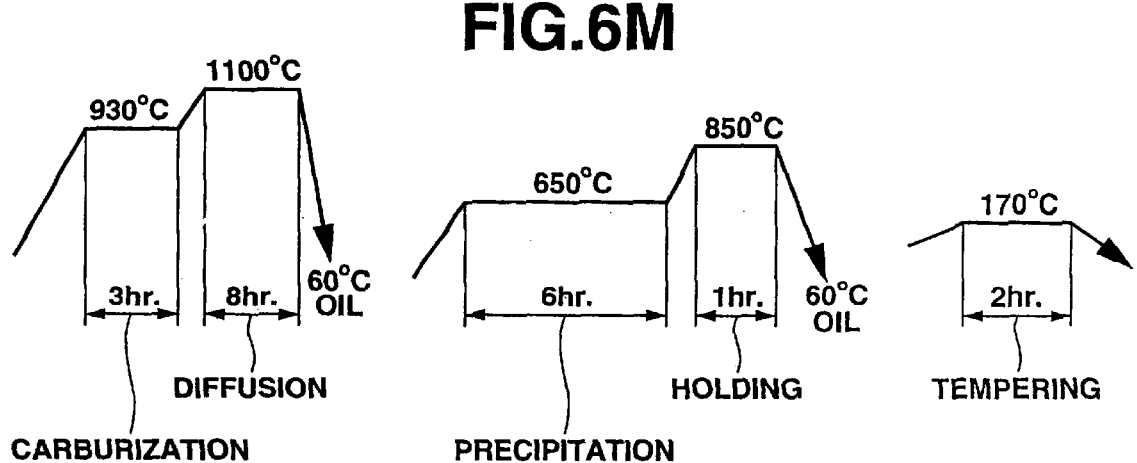
Figure 6N:
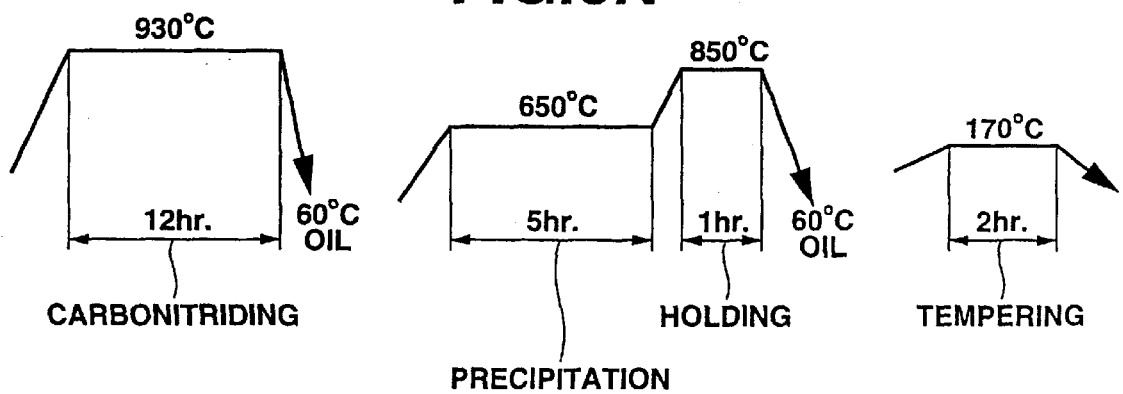

| Classification | Type of Steel | Heat treatment conditions | Surface carbon density (wt %) | Carbon density at 0.1 mm (wt %) | Nitrogen density at 0.1 mm (wt %) | Precipitate structure | Prec. mean particle size ($\mu$m) |
|---|---|---|---|---|---|---|---|
| Examples of the Invention | | | | | | | |
| 1 | A | FIG. 3A | 1.0 | 0.9 | — | $M_{23}C_6$ | 0.18 |
| 2 | B | FIG. 3A | 1.1 | 1.0 | — | $M_{23}C_6$ | 0.21 |
| 3 | C | FIG. 3A | 1.0 | 0.9 | — | $M_{23}C_6$ | 0.22 |
| 4 | D | FIG. 3C | 1.4 | 1.2 | — | $M_{23}C_6$ + $M_3C$ | 0.28 |
| 5 | E | FIG. 3A | 1.0 | 0.9 | — | $M_{23}C_6$ | 0.19 |
| 6 | F | FIG. 3B | 1.1 | 1.0 | — | $M_{23}C_6$ | 0.25 |
| 7 | G | FIG. 3A | 1.0 | 0.9 | — | $M_{23}C_6$ | 0.23 |
| 8 | A | FIG. 4E | 1.0 | 0.9 | — | $M_{23}C_6$ | 0.21 |
| 9 | A | FIG. 4F | 1.0 | 0.9 | — | $M_{23}C_6$ | 0.2 |
| 10 | L | FIG. 5H | 1.0 | 1.0 | — | $M_{23}C_6$ | 0.15 |
| 11 | M | FIG. 5H | 1.3 | 1.3 | — | $M_{23}C_6$ | 0.17 |
| 12 | N | FIG. 5H | 1.5 | 1.5 | — | $M_{23}C_6$ + $M_3C$ | 0.85 |
| 13 | O | FIG. 5I | 0.8 | 0.8 | — | $M_{23}C_6$ | 0.22 |
| 14 | P | FIG. 5J | 0.6 | 0.6 | — | $M_{23}C_6$ | 0.16 |
| 15 | L | FIG. 5K | 1.0 | 1.0 | — | $M_{23}C_6$ | 0.15 |
| 16 | S | FIG. 3A | 1.0 | 0.9 | — | $M_{23}C_6$ | 0.19 |
| 17 | T | FIG. 3A | 1.0 | 0.9 | — | $M_{23}C_6$ | 0.12 |
| 18 | A | FIG. 6I | 1 | 0.9 | — | $M_{23}C_6$ | 0.15 |
| 19 | E | FIG. 6M | 0.9 | 0.8 | — | $M_{23}C_6$ | 0.1 |
| 20 | F | FIG. 6N | 1 | 0.9 | 0.3 | $M_{23}C_6$ | 0.18 |
| 21 | Q | FIG. 5H | 0.4 | 0.4 | — | $M_{23}C_6$ | 0.19 |
| 22 | V | FIG. 3A | 1.0 | 0.9 | — | $M_{23}C_6$ | 0.15 |
| Comparative Examples | | | | | | | |
| 1 | A | FIG. 3D | 1.8 | 1.5 | — | $M_3C$ | 3.94 |
| 2 | H | FIG. 3C | 1.4 | 1.2 | — | $M_3C$ | 3.54 |
| 3 | I | FIG. 3C | 1.4 | 1.2 | — | $M_3C$ | 3.45 |
| 4 | J | FIG. 3A | 1.0 | 0.9 | — | $M_3C$ | 3.44 |
| 5 | K | FIG. 3A | 1.0 | 0.9 | — | $M_3C$ | 3.23 |
| 6 | A | FIG. 4G | 1.0 | 0.9 | — | — | — |
| 7 | R | FIG. 5H | 1.8 | 0.8 | — | $M_3C$ | 3.78 |
| 8 | W | FIG. 3A | 1.0 | 0.9 | — | $M_{23}C_6$ | 0.17 |

TABLE 5

| Classification | Type of Steel | Precipitate surface area ratio at 0.1 mm (%) | Hardness at 0.1 mm (HV) | 300° C. × 3 hr. temper hardness at 0.1 mm (HV) | Thrust test life (L50) (times) | Roller pitting life (times) |
|---|---|---|---|---|---|---|
| Examples of the Invention | | | | | | |
| 1 | A | 10.5 | 821 | 754 | $9.1 \times 10^7$ | Surpassed $10^7$ |
| 2 | B | 6.9 | 819 | 746 | $8.9 \times 10^7$ | Surpassed $10^7$ |
| 3 | C | 3.4 | 825 | 750 | $8.7 \times 10^7$ | Surpassed $10^7$ |
| 4 | D | 15.8 | 820 | 742 | $8.8 \times 10^7$ | Surpassed $10^7$ |
| 5 | E | 7.3 | 816 | 739 | $8.9 \times 10^7$ | Surpassed $10^7$ |
| 6 | F | 17.7 | 817 | 733 | $9.0 \times 10^7$ | Surpassed $10^7$ |
| 7 | G | 12.1 | 822 | 748 | $8.9 \times 10^7$ | Surpassed $10^7$ |
| 8 | A | 25.8 | 841 | 764 | $9.8 \times 10^7$ | Surpassed $10^7$ |
| 9 | A | 0.5 | 825 | 755 | $8.8 \times 10^7$ | Surpassed $10^7$ |
| 10 | L | 12.5 | 815 | 745 | $8.9 \times 10^7$ | Surpassed $10^7$ |
| 11 | M | 25.7 | 829 | 772 | $9.5 \times 10^7$ | Surpassed $10^7$ |
| 12 | N | 8.1 | 786 | 718 | $7.2 \times 10^7$ | Surpassed $10^7$ |
| 13 | O | 9.8 | 795 | 733 | $9.1 \times 10^7$ | Surpassed $10^7$ |
| 14 | P | 7.8 | 778 | 714 | $8.4 \times 10^7$ | Surpassed $10^7$ |
| 15 | L | 13.4 | 821 | 732 | $9.2 \times 10^7$ | Surpassed $10^7$ |
| 16 | S | 28.5 | 815 | 752 | $9.7 \times 10^7$ | Surpassed $10^7$ |
| 17 | T | 16.9 | 811 | 745 | $9.2 \times 10^7$ | Surpassed $10^7$ |
| 18 | A | 20.5 | 819 | 756 | $9.8 \times 10^7$ | Surpassed $10^7$ |
| 19 | E | 19.8 | 807 | 749 | $9.7 \times 10^7$ | Surpassed $10^7$ |
| 20 | F | 2.4 | 798 | 737 | $9.8 \times 10^7$ | Surpassed $10^7$ |
| 21 | Q | 0.1 | 742 | 681 | $5.5 \times 10^7$ | Surpassed $10^7$ |
| 22 | V | 0.1 | 721 | 678 | $4.2 \times 10^7$ | $6.1 \times 10^6$ |
| Comparative Examples | | | | | | |
| 1 | A | 11.1 | 743 | 703 | $3.4 \times 10^7$ | $5.4 \times 10^6$ |
| 2 | H | 7.8 | 725 | 673 | $1.1 \times 10^7$ | $1.4 \times 10^6$ |
| 3 | I | 8.2 | 731 | 671 | $1.2 \times 10^7$ | $1.5 \times 10^6$ |
| 4 | J | 4.9 | 715 | 655 | $1.6 \times 10^7$ | $2.8 \times 10^6$ |
| 5 | K | 5.1 | 709 | 649 | $1.5 \times 10^7$ | $2.9 \times 10^6$ |
| 6 | A | — | 759 | 701 | $4.2 \times 10^7$ | $6.2 \times 10^6$ |
| 7 | R | 8.2 | 785 | 690 | $1.9 \times 10^7$ | $2.2 \times 10^6$ |
| 8 | W | 19.5 | 814 | 739 | $6.2 \times 10^7$ * | Surpassed $10^7$ |

*Note) Internal origin separation starting at inclusions occurred.

As is clear from the results shown in Tables 4 and 5, with respect to the test pieces (high bearing pressure members) of invention examples 1 through 9, after performing carburization treatment on the Cr-content steel so that the surface carbon density is within the prescribed range, namely 0.6–1.5%, carbide was precipitated by holding at a temperature having for its upper limit temperature T (° C.) calculated based on equation T, and after holding at the austenite region temperature of 850° C., quenching and tempering were performed. As a result, microscopic $M_{23}C_6$-type carbide having a mean particle size of 0.3 μm or less was precipitated at a surface area ratio of about several percent to 30%, thereby resulting in a member having improved cold hardness and excellent hardness after tempering treatment for 3 hours at 300° C. (temper softness resistance), which was confirmed to drastically improve pitting life and rolling fatigue life.

Furthermore, under the heat treatment conditions shown in FIG. 3C, there was no carbide precipitation step observed in which the temperature is temporarily held at a low temperature following carburization treatment in comparison with other heat treatment conditions. However, in invention example 4, since the steel type of symbol D shown in Table 1 was used for the raw material steel, upper limit temperature T for carbide precipitation as calculated from equation T was high at 955.5° C. Consequently, $M_{23}C_6$-type carbide (with some $M_3C$-type carbide) was finely precipitated during the time the temperature was held at the austenite temperature of 850° C. for quenching following completion of carburization treatment, allowing the obtaining of excellent cold hardness and temper softening resistance as well as satisfactory pitting life and rolling fatigue life. In other words, in the heat treatment in invention example 4, the carbide precipitation step during which the temperature is held at a temperature having for its upper limit temperature T was performed while overlapping with the quenching temperature of 850° C.

In addition, in invention example 8, by extending the duration of the carbide precipitation step to 5 hours, carbide was precipitated until equilibrium (maximum), and since the duration of the subsequent holding at the austenite region temperature (850° C.) was relatively short at only 30 minutes, the return to solid solution of the carbide was inhibited, thereby increasing the surface area ratio of $M_{23}C_6$-type carbide, improving hardness and resulting in long life. In invention example 9, since the carbide precipitation step was conducted for 30 minutes at 650° C. and the holding time was shortened, the surface area ratio of $M_{23}C_6$-type carbide was observed to be lower than that of invention example 8.

In invention example 10, after performing carbide precipitation treatment for 5 hours at 650° C. on steel having a base metal (matrix) C content of 1.0%, precipitating carbide to the equilibrium state (maximum), holding the temperature at the austenite region temperature of 850° C. for 30 minutes, performing quenching and then tempering, return of the precipitated carbide to solid solution was inhibited to increase the surface area ratio of $M_{23}C_6$-type carbide, improve hardness and extend the life. In addition, in invention example 11 on which similar heat treatment was performed on steel having a base metal (matrix) C content of 1.3%, since the amount of C of the base metal is greater than invention example 10, the surface area ratio of $M_{23}C_6$-type carbide increased, both cold hardness and temper hardness improved and the life was extended. Moreover, in invention example 12 on which similar heat treatment was performed on steel having a base metal (matrix) C content of 1.5%, although some $M_3C$-type carbide was precipitated causing a decrease in the surface area ratio of $M_{23}C_6$-type carbide, since a structure was obtained in which microscopic $M_{23}C_6$-type carbide was precipitated, the life was confirmed to be longer than the comparative examples described later.

In addition, in invention example 13, in which carbide precipitation treatment for 30 minutes at 750° C., which correspond to a higher temperature and shorter duration than invention example 10, was performed on steel having a base metal (matrix) C content of 0.8%, followed by precipitation of carbide to the equilibrium state (maximum) and similarly quenching and tempering, since the base metal (matrix) C content is lower than invention example 10, the surface area ratio of $M_{23}C_6$-type carbide resulting in decreases in cold hardness and temper hardness. However, the structure contained precipitates of microscopic $M_{23}C_6$-type carbide, the life was longer than that of the comparative examples. In invention example 14, in which heat treatment was performed for 30 minutes at 850° C. on steel having a base metal (matrix) C content of 0.6% while holding the temperature at the austenite region during carbide precipitation treatment, although the surface area ratio of $M_{23}C_6$-type carbide was lower than invention example 10 resulting in lower cold hardness and temper hardness due to the lower content of base metal (matrix) C, since a structure was obtained in which microscopic $M_{23}C_6$-type carbide is precipitated, life was confirmed to similarly be longer in comparison with the comparative examples.

Moreover, in invention example 15, after performing carbide precipitation treatment for 5 hours at 650° C. on steel having a base metal (matrix) C content of 1.0% and precipitating carbide to an equilibrium state (maximum) in the same manner as invention example 10 followed by heating for 8 seconds at a constant output of 200 kW and constant frequency of 10 kHz using a high-frequency heater, the structure was quenched in oil at 60° C. As a result, a structure similar to invention example 10 was obtained and was demonstrated to have long life. Furthermore, since heating and holding times are shortened considerably when high-frequency quenching is applied, heat treatment cost can be further reduced in comparison with invention example 10 in which carburization treatment is not performed.

With respect to the test pieces (high bearing pressure members) pertaining to invention examples 16 and 17, after performing carburization treatment on Cr-containing steel so that the surface carbon density was within the prescribed range of 0.6–1.5% and carbon density at the location of the depth of maximum shearing stress (the location of 0.1 mm beneath the surface) was 0.5% or more, carbide was precipitated by holding at the temperature having for its upper limit temperature T (° C.) calculated based on equation T. After additionally holding at the austenite region temperature of 850° C., quenching and tempering treatment were performed. As a result, microscope $M_{23}C_6$-type carbide having a mean particle size of 0.3 μm or less was precipitated at surface area ratios of 16% and 29%. Since this resulted in improved cold hardness and excellent temper softening resistance, pitting life and rolling fatigue life were confirmed to be drastically improved.

In invention example 18, in which carburization treatment was performed under conditions such that the ratio (Td/Tc) of diffusion temperature Td (° C.) to carburization temperature Tc (° C.) was 1.1 followed by temporarily moving into a cooled room to be subjected to gas cooling (cooling rate: 80° C./min.), since grain border reticular carbide was not precipitated on the rolling surface and a structure was obtained in which $M_{23}C_6$-type carbide was finely dispersed, stable pitting strength and rolling fatigue strength were obtained. In invention example 19, after performing carburization treatment under conditions such that the Td/Tc ratio was 1.18 followed by quenching in oil at 60° C. (cooling rate: 33° C./min.) and precipitating carbide for 5 hours at 650° C., the temperature was raised to the austenite region temperature of 850° C. followed by quenching and tempering. As a result, a structure was obtained that was similar to the case of the above invention example 18 in which carburization and diffusion were followed by gas cooling, and stable pitting strength and rolling fatigue strength were similarly obtained.

In addition, in invention example 20, carbonitriding was performed by introducing ammonia gas into the furnace during carburization, and after temporarily quenching in oil at 60° C., precipitation treatment, quenching and tempering were performed in a similar manner. As a result, it was demonstrated that there was similarly no precipitation of grain boundary reticular carbide on the rolling surface, a structure is obtained in which $M_{23}C_6$-type carbide was finely dispersed, and that stable pitting strength and rolling fatigue strength are obtained.

In invention example 21, since carbide precipitation treatment was performed for 5 hours at 650° C. in the same manner as invention example 10 on steel having a base metal (matrix) C content of 0.4% to precipitate carbide in an equilibrium state (maximum) followed by holding for 30 minutes at the austenite region temperature of 850° C., quenching and tempering, $M_{23}C_6$-type carbide was precipitated. The surface carbon density was less than 0.6% and the carbon density at the location of the depth of maximum shearing stress was less than 0.5%, the carbide surface area ratio was roughly only 0.1%, and hardness and rolling fatigue strength slightly lowered. However, good pitting strength was exhibited. In invention example 22, in which heat treatment was performed in the same manner as invention example 1 on steel having low contents of Cr and Mo, the carbide surface area ratio decreased, temper hardness decreased, and it was confirmed that pitting strength and rolling fatigue strength slightly lowered. However, generally good results were exhibited.

In contrast, in comparative example 1, since carburization treatment was performed for the long time of 12 hours as shown in FIG. 3D, surface carbon density exceeded 1.5% resulting in the presence of coarse cementite that did not go into solid solution at the crystal grain boundary during carburization even in the carbide precipitation step. As a result, precipitation of $M_{23}C_6$-type carbide was inhibited, the carbide surface area ratio decreased, quenching decreased, the hardness of the base material (matrix) decreased, cold hardness and temper hardness decreased and adequate pitting life and rolling fatigue life were unable to be obtained.

In addition, in comparative examples 2 and 3, although heat treatment was performed shown in FIG. 3C similar to invention example 4. However, differing from invention example 4, since steel types of symbol H (T=797.5° C.) and symbol I (T=710.8° C.), for which the above temperature T for precipitating carbide as calculated according to equation T is low, were used as members, there was no carbide precipitation step, and $M_3C$-type carbide was only precipitated at a surface area ratio of several percent. Consequently, it was not possible to achieve improvement in cold hardness or temper hardness, and pitting life and rolling fatigue life were similarly inadequate.

In comparative examples 4 and 5, although heat treatment was performed under the conditions shown in FIG. 3A in the same manner as invention example 1, since steel types J and K, which do not contain Cr, were respectively used as the raw materials, $M_{23}C_6$-type carbide was unable to be precipitated in the carbide precipitation step, and only $M_3C$-type carbide was able to be precipitated at a surface area ratio of several percent. Consequently, it was not possible to achieve improvement in cold hardness or temper hardness, and adequate pitting life and rolling fatigue life were similarly confirmed to be unable to be obtained.

In comparative example 6, although a large amount of carbide was precipitated by making the duration of the carbide precipitation step long at 5 hours, since time during which the temperature was held at the austenite region temperature (850° C.) was extended to 3 hours, the carbide that was precipitated in the carbide precipitation step ended up returning to solid solution, thereby preventing improvement of hardness, pitting life and rolling fatigue life.

In addition, in the case of comparative example 7 in which heat treatment was performed in the same manner on steel having a base metal (matrix) C content of 1.8%, since the base metal (matrix) C content exceeded 1.5%, coarse cementite ($M_3C$-type carbide) was present at the grain boundary and precipitation of $M_{23}C_6$-type carbide was inhibited, it was confirmed that the carbide surface area ratio decreased, cold hardness and temper hardness decreased, and adequate pitting strength and rolling fatigue strength were unable to be obtained.

Moreover, in comparative example 8, in which steel having a high S content was used, there was a higher probability of the occurrence of internal origin separation starting at MnS-based inclusions in thrust-type rolling fatigue testing thereby preventing the obtaining of stable rolling fatigue strength. In the case of surface origin separation like that in the roller pitting test, these inclusions had little effect and adequate pitting strength was able to be obtained.

Embodiment 2

Figure 7:
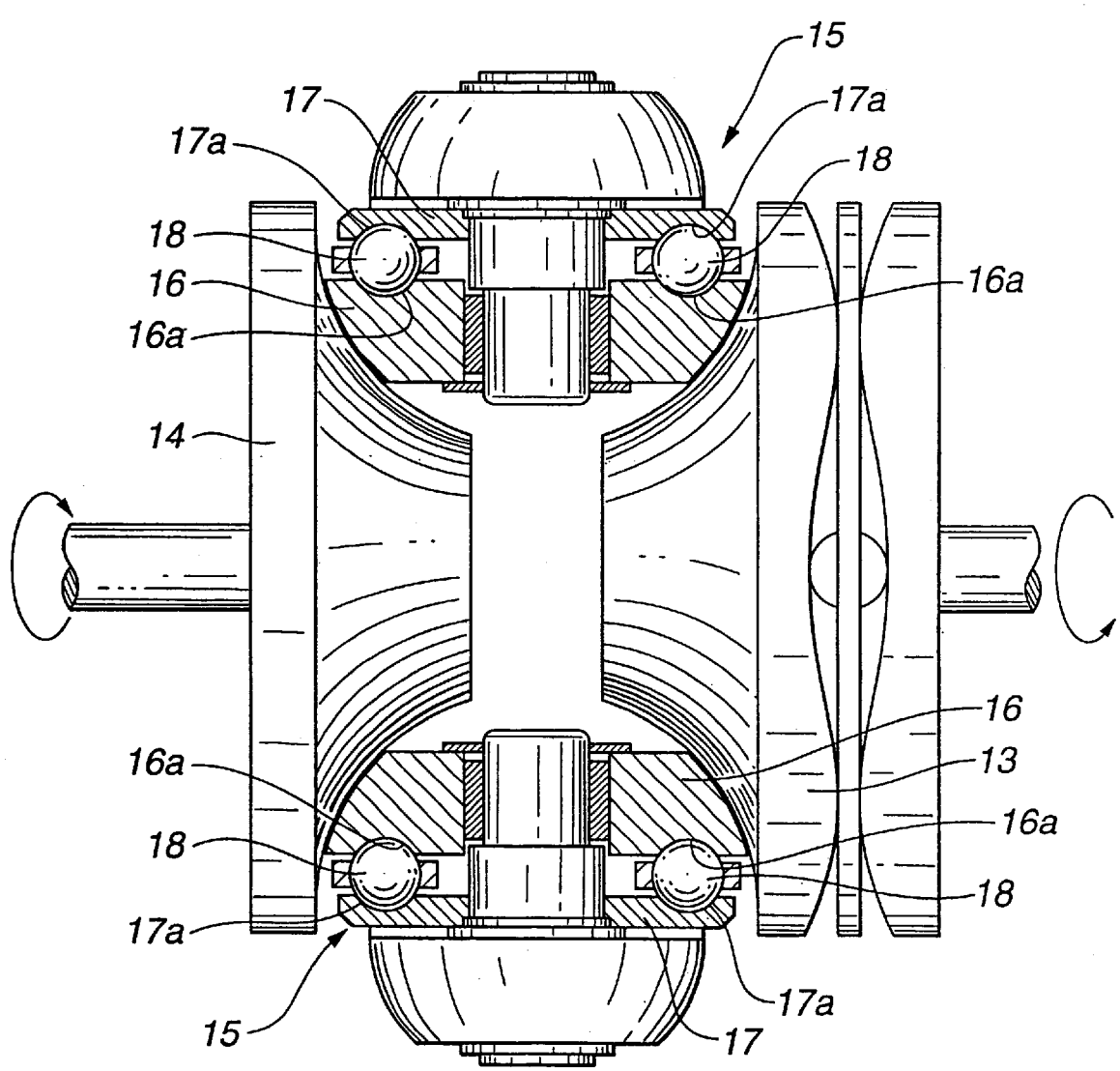
FIG. 7 is a fragmentary sectional view of a toroidal continuously variable transmission box used in an endurance test in the embodiments of the present invention.
Figure 8A:
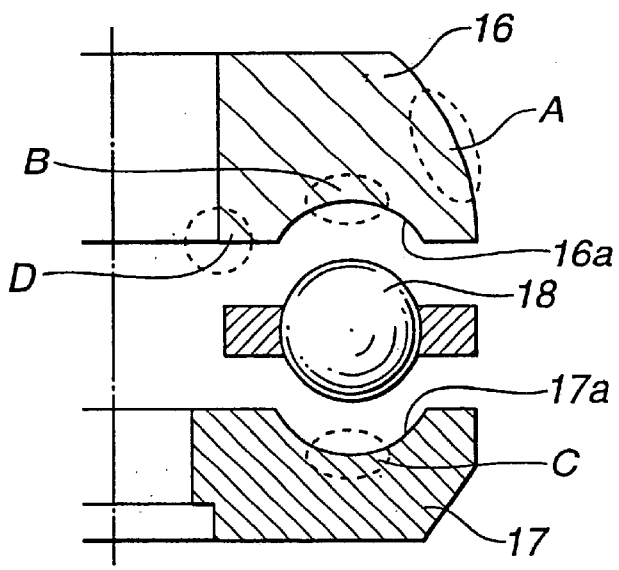
FIGS. 8A and 8B are enlarged fragmentary sectional views which respectively show the shapes of the inner and outer rings of a power roller and a disc for a toroidal continuously variable transmission.
Figure 8B:
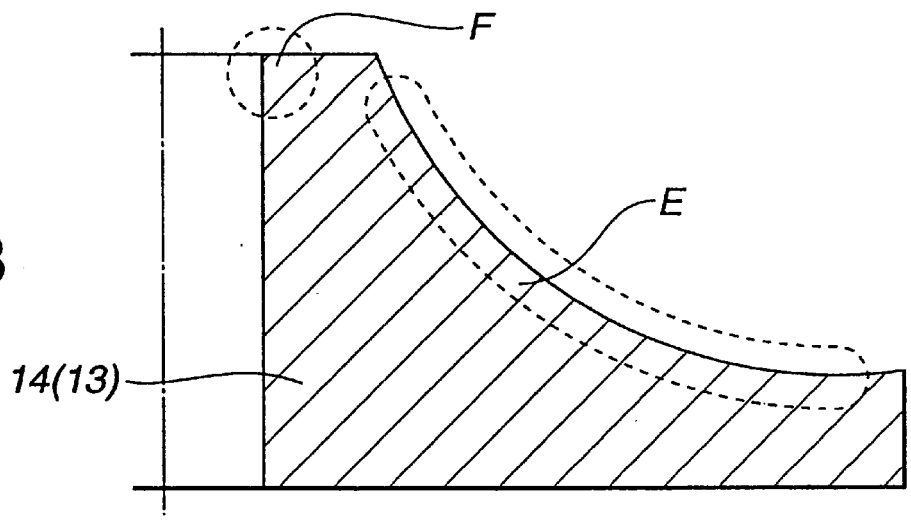

Forging followed by rough machining were performed on steels A, D, E, H and L of the 22 types of steels shown in Table 1 so as to shape input and output discs 13, 14 and inner and outer rings 16 and 17 of power roller 15 for the toroidal continuously variable transmission as shown in FIG. 7 and FIG. 8A and 8B. Thereafter, heat treatment was performed the forged and roughly machined steels under the conditions shown in FIGS. 3A through 6N. Shot-peening was performed at the rectangular portion of the inner diameter hole at the apex of the disks (portion F in FIG. 8B) and at the rectangular portion of the inner diameter hole in the bearing groove of power roller inner ring 16 (portion D in FIG. 8A) together with grinding ultra-finishing at those portions other than the sites at which shot-peening was performed.

Next, these input and output discs 13 and 14 along with inner and outer rings 16 and 17 of power roller 15 were combined, and an endurance test was performed using the toroidal continuously variable transmission box shown in FIG. 7 to evaluate the bending fatigue strength of discs 13 and 14 and power roller inner ring 16 according to the service life (bending fatigue life) until separation or cracking was made. Additionally, the rolling fatigue life of discs 13 and 14 and power roller inner ring 16 was derived from the test results of the above-discussed rolling fatigue test.

As a result, as shown in Table 6, the rolling elements according to invention examples 23, 24, 25 and 26 (these respectively coincide with the combinations of steel types and heat treatment conditions of invention examples 1, 4, 10 and 19 in Embodiment 1) had a structure in which $M_{23}C_6$-type carbide was precipitated. Consequently, since the temper hardness at the rolling contact surface is high, there is resistance to plastic deformation even at high contact bearing pressures. In addition, since there is high temper hardness even at the location of the depth of maximum shearing stress, there is little susceptibility to the occurrence of structural changes caused by rolling fatigue, thereby resulting in long life.

On the other hand, in the rolling elements pertaining to comparative examples 9 and 10 (these coincide with the combinations of steel types and heat treatment conditions of comparative examples 1 and 2 in Embodiment 1), since $M_{23}C_6$-type carbide is not precipitated, there is increased susceptibility to plastic deformation at high contact bearing pressures, and separation was confirmed to occur easily.

TABLE 6

| | | | | | Endurance test | |
|---|---|---|---|---|---|---|
| Classification | Type of Steel | Heat Treatment Conditions | Site | Shot-peening | Rolling fatigue life | Bending fatigue life |
| Invention ex. 23 (Invention ex. 1) | A | FIG. 3A | A | No | ◉ | — |
| | | | B | No | ◉ | — |
| | | | C | No | ◉ | — |
| | | | D | Yes | — | ○ |
| | | | E | No | ◉ | — |
| | | | F | Yes | — | ○ |
| Invention ex. 24 (Invention ex. 4) | D | FIG. 3C | A | No | ◉ | — |
| | | | B | No | ◉ | — |
| | | | C | No | ◉ | — |
| | | | D | Yes | — | ○ |
| | | | E | No | ◉ | — |
| | | | F | Yes | — | ○ |
| Invention ex. 25 (Invention ex. 10) | L | FIG. 5H | A | No | ◉ | — |
| | | | B | No | ◉ | — |
| | | | C | No | ◉ | — |
| | | | D | Yes | — | Δ |
| | | | E | No | ◉ | — |
| | | | F | Yes | — | Δ |
| Invention ex. 26 (Invention ex. 19) | E | FIG. 6M | A | No | ◉ | — |
| | | | B | No | ◉ | — |
| | | | C | No | ◉ | — |
| | | | D | Yes | — | Δ |
| | | | E | No | ◉ | — |
| | | | F | Yes | — | Δ |
| Comparative ex. 9 (Comparative ex. 1) | A | FIG. 3D | A | No | Δ | — |
| | | | B | No | Δ | — |
| | | | C | No | Δ | — |
| | | | D | Yes | — | Δ |
| | | | E | No | Δ | — |
| | | | F | Yes | — | Δ |
| Comparative ex. 10 (Comparative ex. 2) | H | FIG. 3C | A | No | Δ | — |
| | | | B | No | Δ | — |
| | | | C | No | Δ | — |
| | | | D | Yes | — | ○ |
| | | | E | No | Δ | — |
| | | | F | Yes | — | ○ |

Note) ◉ indicates excellent evaluation; ○ indicates better evaluation; and Δ indicates good evaluation.

Embodiment 3

After performing lathe turning and gear cutting using steels A, D, E, H and L shown in Table 1 in the same manner as Embodiment 2, heat treatment was performed on each steel by combining with the same conditions as Embodiment 2 followed by shot-peening and grinding to obtain the gears having the specifications shown in Table 7.

TABLE 7

| Type of test gear | Spiral bevel gear |
|---|---|
| Module | 3.87 |
| Pressure angle | 17.5° |
| Number of teeth | 21 |
| Spiral angle | 150 |
| Standard pitch circle | 84.1 mm |

An anti-pitting test was then performed using a power circulating type of gear pitting tester based on the conditions of a Hertz bearing pressure at the gear pitting point of 2.0 GPa, test gear rotating speed of 1000 rpm, automatic transmission fluid (ATF) for the oil type and an oil temperature of 120° C. Pitting life was evaluated in terms of the total number of rotations until the surface area of separation caused by pitting that occurred on the tooth surfaces of the test gear reached a surface area equivalent to 3% of the effective meshing surface area of the entire gear.

As shown in Table 8, in the gears produced by invention examples 27, 28, 29 and 30 (equivalent to the combinations of invention examples 1, 4, 10 and 19 in Embodiment 1), since $M_{23}C_6$-type carbide was finely dispersed and high hardness was maintained even after tempering, pitting life improved considerably. On the other hand, in the case of the gears produced according to comparative examples 11 and 12 (equivalent to the combinations of comparative examples 1 and 2 in Embodiment 1), since the structure did not contain precipitation of $M_{23}C_6$-type carbide, temper hardness was low and pitting occurred easily.

TABLE 8

| Classification | Type of Steel | Heat Treatment | Arc Height (mm) | Pitting Life |
|---|---|---|---|---|
| Invention example 25 (Invention example 1) | A | FIG. 3A | 1.1 | Surpassed $1 \times 10^7$ times |
| Invention example 26 (Invention example 4) | D | FIG. 3C | 0.95 | Surpassed $1 \times 10^7$ times |
| Invention example 27 (Invention example 10) | L | FIG. 5H | 1.02 | Surpassed $1 \times 10^7$ times |
| Invention example 28 (Invention example 19) | E | FIG. 6M | 1.08 | Surpassed $1 \times 10^7$ times |
| Comparative example 13 (Comp. example 1) | A | FIG. 3D | 0.98 | $5.7 \times 10^6$ times |
| Comparative example 14 (Comp. Example 2) | H | FIG. 3C | 1.1 | $1.5 \times 10^6$ times |

Note) Arc height indicates intensity of shot-peening and corresponds to height of warp of thin sheet under shot-peening.

Next, second mode of the high bearing pressure-resistant member according to the present invention will be discussed with reference to FIGS. 1 and 2, and FIGS. 7 through 10G.

As is previously described, a high bearing pressure-resistant member such as a toroidal continuously variable transmission in the form of disk and power roller makes rolling contact under a harsh environment of high speed and high temperature while being subjected to a heavy load. This environment is becoming increasing harsh accompanying reduced size and higher capacities of transmissions and power transfer units using such high bearing pressure members. As a result, the rolling portions of these members (for example, the traction surfaces and bearing grooves in the case of discs and power rollers) are required to be resistant to the internal origin separation caused by rolling fatigue as well as high rolling fatigue strength.

In the case of performing ordinary carburization or carbonitriding on such a high bearing pressure member, the base material (matrix) takes on a martensite or bainite structure and there is hardly any carbide present. In contrast, when the base material (matrix) of the high bearing pressure-resistant member includes a martensite and/or bainite structure and contains microscopic carbide having a mean particle size of 3 μm or less is dispersed and precipitated in the form of spheres or pseudo-spheres in this base material, room temperature hardness of the high bearing pressure-resistant member increases, reductions in hardness under high temperatures of the same are inhibited and internal origin rolling fatigue life of the same is improved. Moreover, it is preferable that the high bearing pressure-resistant member includes a biphasic structure provided with a first phase composed of martensite and/or bainite that is substantially free of carbide, and a second phase in which microscopic carbide is dispersed and precipitated in the form of spheres or pseudo-spheres in the manner described above in the base material (matrix) having a martensite and/or bainite structure. As a result, the high bearing pressure-resistant member has both higher rolling fatigue strength and bending fatigue strength than a case where carbide are uniformly precipitated throughout the entire region. However, in the case the mean particle size of the carbide in the second phase region exceeds 3 μm or the carbide is precipitated in reticular form instead of in the form of spheres or pseudo-spheres, although room temperature hardness and high-temperature softening resistance are improved, the action of improving rolling fatigue life decreases because the precipitated carbide acts as a source of stress concentration resulting in increased susceptibility of the formation of crack starting points and propagation routes.

$M_{23}C_6$-type carbide containing Cr is more preferable than $M_3C$-type carbide for use as the carbide at this time since it tends to be stable even during rolling fatigue at high temperatures, inhibit decreases in hardness, and improve rolling fatigue life by delaying changes in the internal structure.

In addition, it is also preferable that the surface area ratio of the above carbide in the second phase region be within the range of 0.3–30% relative to the total area of the first and second phase region. Namely, in the case the surface area ratio of carbide in the second phase region is less than 0.3%, inhibition of high-temperature softening and the action of delaying structural changes are inadequately obtained. Conversely, in the case the surface area ratio exceeds 30%, decreases in alloy elements and carbon density in the base material (matrix) are made and therefore invite decreased hardness of the base material, thereby tending to prevent adequate improvement of rolling fatigue life.

Moreover, it is preferable that the S content be 0.01% or less. If this is done, although MnS-based inclusions are reduced and machinability decreases, a stable, long service life is obtained. If the amount of S exceeds 0.01%, although MnS-based inclusions facilitate cutting, the probability of the occurrence of internal origin separation starting at MnS-based inclusions under rolling contact increases, making it difficult to obtain a stable service life.

In the high bearing pressure-resistant member of the present invention, since the amount of nitrogen solid solution in its surface (after final grinding) is within a range of from 0.01 to 0.5%, and solid solutions of nitrogen have the effect of spreading Acm lines into high carbon regions, the precipitation of reticular carbide is prevented by adding at 0.01% or more. However, if the amount of nitrogen solid solution exceeds 0.5%, the amount of nitrogen solid solution in the matrix increases and tends to decrease the amount of precipitation of $M_{23}C_6$-type carbide.

In the high bearing pressure-resistant member of the present invention, since the surface carbon density at the site subjected to rolling fatigue caused by rolling contact is within a range of from 0.6 to 1.5%, a high degree of strength is maintained and fatigue strength is improved. In the case the carbon density at this time is less than 0.6%, since the carbide surface area ratio in the second phase cannot be secured, hardness can no longer be maintained. Conversely, if the surface carbon density exceeds 1.5%, there is greater susceptibility to precipitation of $M_3C$-type carbide, and this tends to grow in reticular form at a mean particle size in excess of 3 μm.

The high bearing pressure-resistant member of the present invention is suitably applied in the rolling elements of a toroidal continuously variable transmission, namely the discs or power rollers of a toroidal continuously variable transmission, and contributes to reduced size, increased capacity and extension of service life of the toroidal continuously variable transmission.

As is previously described, both rolling fatigue strength and bending fatigue strength is preferable to be realized in the discs and power rollers of toroidal continuously variable transmissions. Moreover, those demand characteristics are not necessarily uniform, and each differ depending on the site of each rolling element. This will be discussed in detail with reference to FIGS. 7, 8A and 8B.

Namely, with respect to those sites subjected to rolling fatigue caused by a repetitive load of shearing stress as in the traction surface of input and output discs (portion E in FIG. 8B), the traction surface of power rollers (portion A in FIG. 8A) and bearing grooves (portions B and C in FIG. 8A), it is preferable that the surface area ratio of the second phase in which carbide is finely dispersed and precipitated be 3% or more, and more preferably 50% or more at least in the surface portion at that site down to the depth of occurrence of maximum shearing stress. As a result, the internal origin rolling fatigue strength is improved and rolling fatigue life is extended. Moreover, it is preferable that the carbon density be 0.5% or more at the above-mentioned site since this results in adequate pitting strength and rolling fatigue strength. Furthermore, in the case the carbon density is less than 0.5%, it is not possible to secure the carbide surface area ratio at the location of the depth of occurrence of maximum shearing stress caused by rolling contact, and this tends to make it difficult to improve cold hardness and temper hardness.

In addition, with respect to those sites requiring resistance to intrusion of foreign matter as a result of being sensitive to the starting points of surface indentations caused by intrusion of foreign matter since the contact ellipse becomes smaller than the traction surface as in the bearing grooves of the power rollers (portions B and C of FIG. 8A), it is preferable that the surface area ratio of the second phase in which carbide is finely dispersed and precipitated be 3–100% on the uppermost surface, and more preferably within the range of from 50 to 80%. As a result, the first phase, which has lower hardness and a large amount of residual austenite than the second phase, alleviates stress concentration of indentations on the uppermost surface and improves resistance to the intrusion of foreign matter.

Moreover, with respect to those sites which, although not make rolling contact, are subjected to bending fatigue due to the repetitive load of bending stress as in the rectangular portion of the inner diameter hole at the apex of the input and output discs (portion F in FIG. 8B) and the rectangular portion of the inner diameter hole of the bearing grooves of the power roller inner ring (portion D in FIG. 8A), it is preferable that the surface area ratio of the above second phase be 90% or less, and more preferably 30% or less at the uppermost surface, and that shot-peening be performed. As a result, machining-induced transformation and residual compression stress of the first phase occur at said sites leading to improved bending fatigue strength. Furthermore, if the surface area ratio of the second phase at this time exceeds 90%, in addition to it being easier for the carbide dispersed in the second phase to act as the starting point or propagation route for cracks, the machining-induced transformation of the first phase becomes inadequate, and there is increased susceptibility to the formation of microscopic cracks during shot-peening, which tends to decrease the amount of improvement in bending fatigue strength.

In the high bearing pressure-resistant member of the present invention, the biphasic structure including the first phase having a martensite and/or bainite structure that is substantially free of precipitation of carbide, and the second phase, in which carbide is finely dispersed and precipitated in the base material (matrix) having a martensite and/or bainite structure, is obtained by precipitating carbide by holding at a prescribed temperature for a prescribed period of time either after performing carburization treatment on mechanical structural steel containing carbide forming elements such as Cr and Mo, or without performing carburization treatment by using mechanical structural steel containing a prescribed amount of Cr, and then quenching by heating and holding at the austenite region temperature and finally performing tempering treatment. At this time, the surface area ratio of the second phase can be controlled by adjusting the surface carbon density by carburization treatment, adjusting the holding temperature and holding time in the carbide precipitation step, and adjusting the holding temperature and holding time at the austenite region temperature. The surface area of the second phase becomes larger, as the surface carbon density by carburization treatment becomes higher, as the holding temperature of the carbide precipitation step becomes higher, as the longer the holding time becomes higher, or as the holding temperature in the austenite region prior to quenching becomes lower.

Namely, the following production process of the high bearing pressure-resistant member is suitable for the production of the high bearing pressure-resistant member of the present invention. The production process comprises (a) performing a carburization treatment on a material member formed of a mechanical structural steel containing Cr so that a surface carbon density of the mechanical structural member is within a range of from 0.6 to 1.5% by weight; (b) precipitating carbide by holding the carburized material member at a precipitation temperature Tp (° C.) having an upper limit temperature T (° C.) calculated according to a first equation: $T=675+120 \cdot Si(\%)-27 \cdot Ni(\%)+30 \cdot Cr(\%)+215 \cdot Mo(\%)-400 \cdot V(\%)$ based components of the material member for a time shorter than a time t (hr.) calculated according to a second equation $t=10^{\{19000/(Tp+273)-20\}}$ based on the precipitation temperature Tp (° C.); and (c) quenching the carbide-precipitated material member by rapidly cooling the carbide-precipitated member after holding the carbide-precipitated material member at at least one of a $Ac_1$ transformation temperature and a temperature (austenite region temperature) at which austenite phase is formed. Consequently, this production process for the high bearing pressure-resistant member inhibits the precipitation of coarse, reticular $M_3C$-type carbide in the surface portion that includes the location of maximum shearing stress depth caused by rolling contact, allows the obtaining of a first phase in which carbide is substantially not precipitated, and a second phase in which fine $M_{23}C_6$-type carbide that is stable even at the semi-high to high temperatures is precipitated and the matrix after quenching has a martensite and/or bainite structure. As a result, the high bearing pressure-resistant member is obtained that secures high hardness even at the semi-high to high temperatures, and has excellent surface fatigue strength such as pitting strength and rolling fatigue strength even under high bearing pressure such that local bearing pressure exceeds 3 GPa.

At this time, in the case the surface carbon density of the carburized layer is less than 0.6%, it is not possible to secure hardness. Conversely, in the case the surface carbon density exceeds 1.5%, there is increased susceptibility to precipitation of $M_3C$-type carbide, and there is reticular growth at a mean particle size that exceeds 3 $\mu$m thereby making this undesirable. Furthermore, there are no particular restrictions on the method of carburization treatment, and although methods such as solid carburization, liquid carburization or gas carburization can be used, it is preferable to employ vacuum carburization or plasma carburization if possible. This is because, since vacuum carburization and plasma carburization are vacuum treatments, a grain boundary oxidation layer is not formed on the surface and there are no decreases near the surface in the densities of carbide forming elements such as Cr, thereby making these treatments advantageous since they allow carbide to be formed down to the surface.

As is previously described, although the Cr in the raw material steel (or the material member) in the present invention is an essential alloy component that forms carbide, and particularly $M_{23}C_6$-type carbide, its amount added is preferably about 1 to 4% from the viewpoint of ensuring its effect while avoiding increases in cost and decreased cutting ease.

The above equation T that is used to calculate the upper limit value of the holding temperature for precipitating carbide was determined as a result of numerous experiments, and by holding the (material) member after carburization treatment to temperature Tp (° C.) equal to or below temperature T (° C.) calculated according to the alloy components of the member, $M_{23}C_6$-type carbide is precipitated. Since the mean particle size of $M_{23}C_6$-type carbide is extremely minute at 1 $\mu$m or less, it is unlikely to be a source of stress concentration. Since it is also dispersed and precipitated within crystal grains of martensite and/or bainite, it is resistant to softening at semi-high and high temperatures, thereby ensuring high hardness. By making the time of carbide precipitation treatment, namely the holding time at temperature Tp (° C.), shorter than time t as calculated according to equation t corresponding to the above-mentioned precipitation temperature Tp (° C.), precipitation is discontinued prior to reaching equilibrium. In addition, it is preferable that the lower limit temperature of carbide precipitation treatment be 550° C. or higher from the viewpoint of productivity.

At this time, if carbide precipitation treatment is performed at a temperature higher than temperature T (° C.) calculated according to the alloy components, $M_{23}C_6$-type carbide is not precipitated and a solid solution structure results that prevents the obtaining of hardness. Consequently, pitting strength and rolling fatigue strength become inadequate. Furthermore, the upper limit t of holding time during carbide precipitation treatment is calculated according to the above second calculation equation, such that, for example, t is approximately 58 hours when holding temperature T is 600° C., t is approximately 3.85 hours when T is 650° C., t is approximately 0.34 hours (approximately 20 minutes) when T is 700° C., and t is approximately 0.037 hours (approximately 2.5 minutes) when T is 750° C.

If the holding time at the austenite region temperature in the quenching step is too long, precipitated carbide ends up returning to a solid solution in the carbide precipitation step. Consequently, a holding time from about 30 minutes to 2 hours is suitable, and it is preferable that treatment beyond 2 hours be avoided.

Since the production process of the high bearing pressure-resistant member of the present invention is also suitable for production of the above high bearing pressure-resistant member of the present invention, consisting mainly of a carburization step, carbide precipitation step and quenching step, wherein carburization treatment is performed on a member comprising mechanical structural steel containing 1.2 to 3.2% of Cr and 0.25 to 2.0% of Mo, carburization treatment is performed such that the surface carbon density is within a range of from 0.6 to 1.5% and the carbon density at the depth location of occurrence of the maximum shearing stress caused by rolling contact is within the range of 0.5% or more, carbide is precipitated while holding the carburized member at a precipitation temperature Tp (° C.) having for its upper limit temperature T (° C.) as calculated from the above first equation for an amount of time that is shorter than time t (hr.) calculated from the above second equation, and quenching is performed after holding at the austenite region temperature, a similar biphasic structure results that is composed of a first phase and second phase, and a high bearing pressure-resistant member is similarly obtained that has excellent surface fatigue strength such as pitting strength and rolling fatigue strength.

Here, in the case the surface carbon density of the carburized layer is less than 0.6%, hardness can similarly not be secured, and conversely if the surface carbon density exceeds 1.5%, there is increased susceptibility to precipitation of $M_3C$-type carbide that grows in a reticular form having a mean particle size in excess of 3 $\mu$m, thereby making this undesirable. In addition, in the case the carbon density at the depth location of maximum shearing stress caused by rolling contact is less than 0.5%, the carbide surface area ratio at this depth location is unable to reach 0.3%, thereby failing to improve cold hardness or temper hardness and preventing the obtaining of adequate pitting strength and rolling fatigue strength.

Furthermore, there are no particular restrictions on the carburization treatment method and although methods such as solid carburization, liquid carburization or gas carburization can be used, it is preferable to employ vacuum carburization or plasma carburization if possible.

Although the Cr in the raw material steel in the present invention is an essential alloy component that forms carbide, and particularly $M_{23}C_6$-type carbide, as is previously mentioned, its amount added is preferably about 1.2 to 3.2% from the viewpoint of ensuring its action while avoiding increases in cost and decreased cutting ease. Although Mo is added since addition simultaneous to Cr allows stable precipitation of $M_{23}C_6$-type carbide, if the amount of Mo added is less than 0.25%, stable precipitation of $M_{23}C_6$-type carbide cannot be expected, and if the amount added exceeds 2%, cutting ease tends to decrease.

In the production process of a high bearing pressure-resistant member of the present invention, since conditions are preferably used such that the ratio (Td/Tc) of diffusion temperature Td (° C.) following carburization to carburization temperature Tc (° C.) when carburization treatment is performed by vacuum carburization or plasma carburization is within the range of from 1.05 to 1.25, reticular carbide precipitated at the grain boundary during carburization disappears easily. At this time, in the case the ratio of Td/Tc does not reach 1.05, it become difficult to obtain this effect. In addition, the higher the temperature of diffusion, the larger the diffusion coefficient of carbon inside. This facilitates the disappearance of reticular carbide. However, in case that the ratio of Td/Tc exceeds 1.25, there is melting of the steel surface, and therefore it is preferable that the upper limit of this ratio be 1.25.

On the other hand, if the cooling rate until the intermediate holding step (carbide precipitation step) following carburization diffusion is too slow, supersaturated carbon is likely to be precipitated in reticular form at the grain boundary. Accordingly, it is preferable that the cooling rate at this time be 10° C./minute or more. Preferable methods for achieving a cooling rate of 10° C./minute or more include gas cooling to the intermediate holding temperature in a carburization diffusion chamber, transferring to a cooling chamber outside the carburization diffusion chamber and lowering to the intermediate holding temperature, and temporarily quenching after carburization diffusion followed by heating to the intermediate holding temperature.

Moreover, in the production process of the high bearing pressure-resistant member, in addition to the above steps, nitriding is performed either simultaneous to carburization (carburization nitriding) or following completion of carburization, and therefore precipitation of reticular carbide is prevented by nitrogen in solid solution.

Since the production process of the high bearing pressure-resistant member of the present invention preferably includes precipitating carbide while holding a member (material member) composed of mechanical structural steel containing Cr and 0.6 1.5% of carbon at a precipitation temperature Tp (° C.) having for its upper limit temperature T (° C.) calculated from the above first equation for an amount of time shorter than time t (hr.) calculated according to the above second equation, followed by performing quenching after holding at the austenite region temperature. As a result, precipitation of coarse, reticular $M_3C$-type carbide (cementite) at the surface layer portion that contains the depth location of maximum shearing stress caused by rolling contact is inhibited so that microscopic $M_{23}C_6$-type carbide that is stable even at the semi-high to high temperatures (300° C. or less) is precipitated and the matrix becomes a martensite structure. This allows the obtaining of a similar biphasic structure and the obtaining of the high bearing pressure-resistant member that has excellent surface fatigue strength such as pitting strength and rolling fatigue strength, while also realizing low production cost as a result of not requiring a carburization step.

Since the production process of the high bearing pressure-resistant member of the present invention preferably includes precipitating carbide by holding a member composed of mechanical structural steel containing 1.2 to 3.2% of Cr, 0.25 to 2.0% of Mo and 0.6 to 1.5% of C at a precipitation temperature Tp (° C.) having for its upper limit temperature T (° C.) calculated from the above first equation for an amount of time shorter than time t (hr.) calculated according to the above second equation, and quenching by cooling rapidly after holding at the austenite region temperature. In this production process, a carburization step is similarly not required, and precipitation of coarse, reticular $M_3C$-type carbide at the surface layer portion that contains the depth location of maximum shearing stress caused by rolling contact is similarly inhibited. Additionally, a biphasic structure is obtained consisting of a first phase that does not contain carbide and a second phase in which microscopic carbide is precipitated in a matrix consisting of martensite and/or bainite. Consequently, a high bearing pressure-resistant member can be inexpensively obtained that secures high hardness and has excellent surface fatigue strength such as pitting strength and rolling fatigue strength even under high bearing pressure.

In the production process of the high bearing pressure-resistant member, since nitriding is preferably performed on the member (material member) in addition to the above, precipitation of reticular carbide on the member surface is inhibited by nitrogen in solid solution. Furthermore, the nitriding treatment at this time may be performed before or after the carbide precipitation step. In the production process of the high bearing pressure-resistant member, since holding at the austenite region temperature prior to quenching is preferably performed simultaneous to the carbide precipitation step, this step can be simplified in the case the austenite region temperature coincides with the carbide precipitation temperature, thereby enabling cost to be reduced.

EMBODIMENTS

The following provides a detailed explanation of the present invention based on its embodiments.

Embodiment 4

Small roller test piece 1 for roller pitting testing as shown in FIG. 1 (diameter of large diameter portion D1=26 mm, length of large diameter portion L1=28 mm, diameter of small diameter portion D2=24 mm and length of small diameter portion L2=51 mm), and disk-shaped test piece 3 for thrust-type rolling fatigue testing as shown in FIG. 2 (diameter D4=60 mm, thickness t2=5 mm) were cut out using mechanical structural steel of each of the compositions shown in Table 9. Then, after performing carburization or carbonitriding, carbide precipitation treatment, quenching and tempering according to either of the conditions shown in FIGS. 9A through 10G, the surface of each test piece was finished by grinding. Plasma carburization was used for the carburization method at this time.

TABLE 9

| Type of Steel | Chemical Composition (wt %) | | | | | | | | | |
|---|---|---|---|---|---|---|---|---|---|---|
| | C | Si | Mn | P | S | Ni | Cr | Mo | V | T* |
| 1A | 0.20 | 0.25 | 0.30 | 0.015 | 0.009 | 1.9 | 2.00 | 0.70 | 0.20 | 784.2 |
| 1B | 0.20 | 0.25 | 0.80 | 0.015 | 0.009 | — | 1.10 | 0.15 | — | 770.25 |
| 1C | 1.00 | 0.25 | 0.30 | 0.015 | 0.003 | 2.0 | 2.00 | 0.70 | 0.19 | 785.5 |
| 1D | 0.60 | 1.03 | 0.39 | 0.013 | 0.005 | 2.1 | 2.10 | 1.20 | 0.00 | 1062.9 |

TABLE 9-continued

| Type of Steel | Chemical Composition (wt %) | | | | | | | | | |
|---|---|---|---|---|---|---|---|---|---|---|
| | C | Si | Mn | P | S | Ni | Cr | Mo | V | T* |
| 1E | 0.40 | 1.00 | 0.35 | 0.015 | 0.006 | 2.0 | 2.00 | 1.50 | 0.20 | 1043.5 |
| 1F | 1.80 | 1.10 | 0.40 | 0.014 | 0.003 | 1.9 | 2.10 | 1.40 | 0.20 | 1039.7 |
| 1G | 0.20 | 1.00 | 0.30 | 0.015 | 0.015 | 2 | 1.50 | 1.50 | 0.20 | 1028.5 |

*Note) T = 675 + 120.Si (%) − 27.Ni (%) + 30.Cr (%) + 215.Mo (%) − 400.V (%)

As shown in FIG. 1, the rolling pitting test was conducted under the conditions shown in Table 2 by combining small roller test piece 1 and disk-shaped partner material 2 (diameter D3=130 mm, thickness t1=18 mm) to determine roller pitting time or the number of repetitions or rotations (times) until pitting occurred.

In addition, with respect to the rolling fatigue test, disk-shaped test piece 3 and three spheres 5 as partner materials were combined in lubricating oil 4 using the thrust-type rolling fatigue tester as shown in FIG. 2, and thrust test life (L50) of disk-shaped test piece 3 was determined as follows: Five rolling fatigue tests were repeated to obtain test result of number (times) of turning of three spheres 5 along the periphery of disk-shaped test piece 3 at a time when separation or peeling occurred under the conditions shown in Table 3. Then five test results were plotted on a Wiebull probability paper, thereby determining the damage probability 50% life (L50) which was the life (the above turning number) until the separation or peeling occurred.

The cross-section of the thrust-type test piece obtained in the above manner was corroded with an alcohol solution containing 3% nitric acid, and after taking microphotographs at 10,000 magnifications of first cross-section of the test piece extending from the uppermost surface to a depth of 0.1 mm and of second cross-section (of the test piece) perpendicular to the first (vertical) cross-section by using a scanning electron microscope. The second cross-section was located at a depth of 0.1 mm of the test piece. Thereafter, mean particle size of the precipitated carbide at the first cross-section and surface area ratio (rate) of the precipitated carbide at the second cross-section were measured using an image analyzer. Further, the surface area ratio (rate, %) of the second phase was measured, and the surface area ratio (rate, %) of carbon in the second phase was measured.

Cuttings from the uppermost surface of the test piece to a depth of 0.1 mm were sampled, and carbon density was measured according to the combustion method to determine the surface carbon density. Moreover, precipitate structure of the carbide was identified from electron beam diffraction patterns according to the replica method. In addition, the density of carbon at the above-mentioned second cross-section located at a depth of 0.1 mm was also measured by using emission spectrochemical analysis. In addition, the structure of the base material (matrix) was confirmed.

These results are shown in Tables 10 and 11.

TABLE 10

Figure 9A:
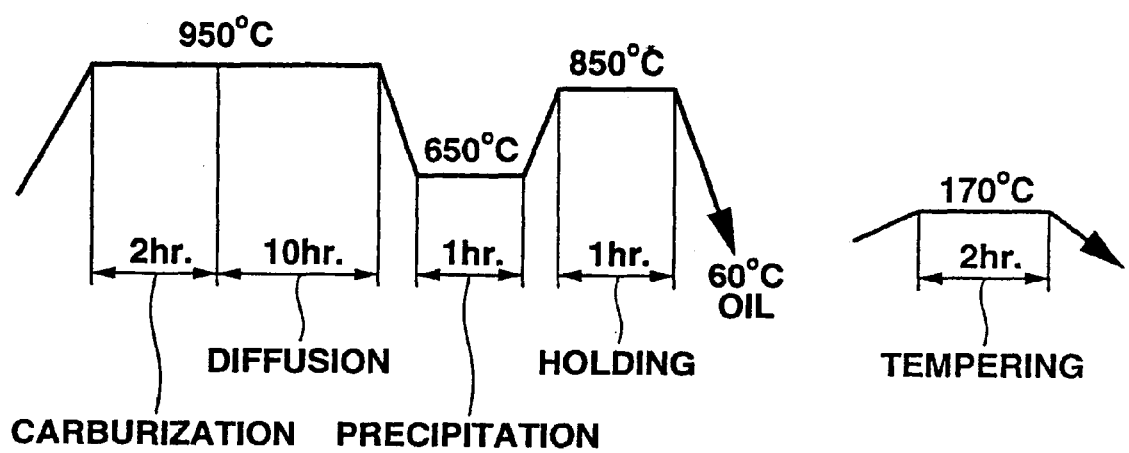
FIGS. 9A to 9D are graphical representations of heat treatment conditions applied in embodiments of the present invention.
Figure 9B:
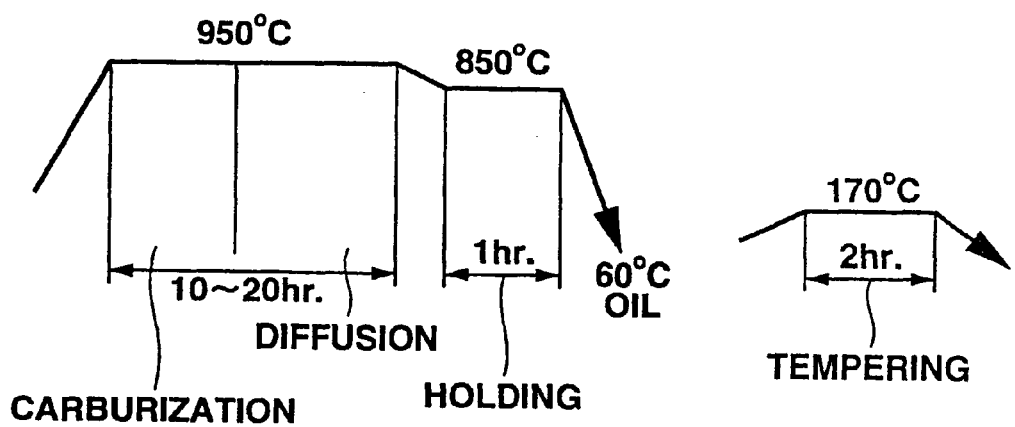
Figure 9C:
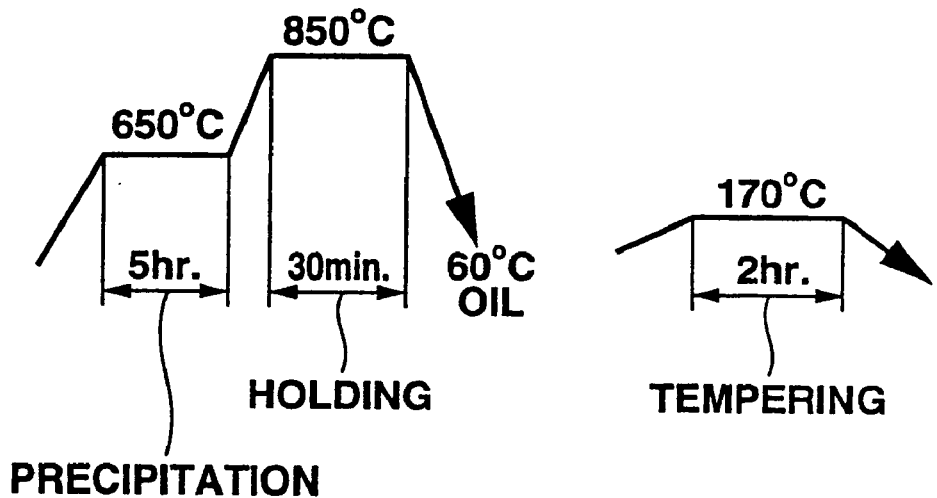
Figure 9D:
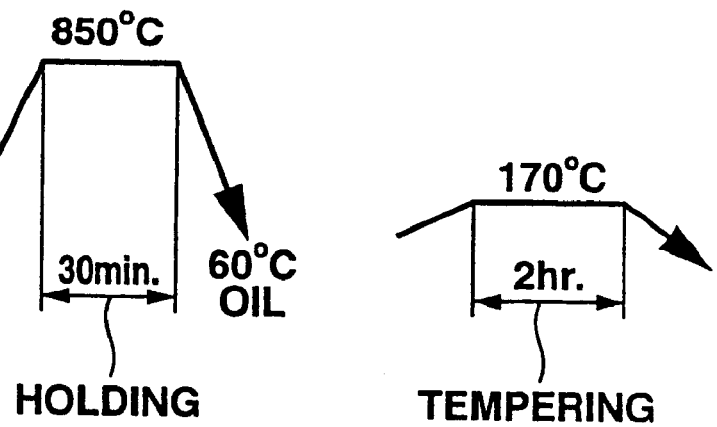
Figure 10E:
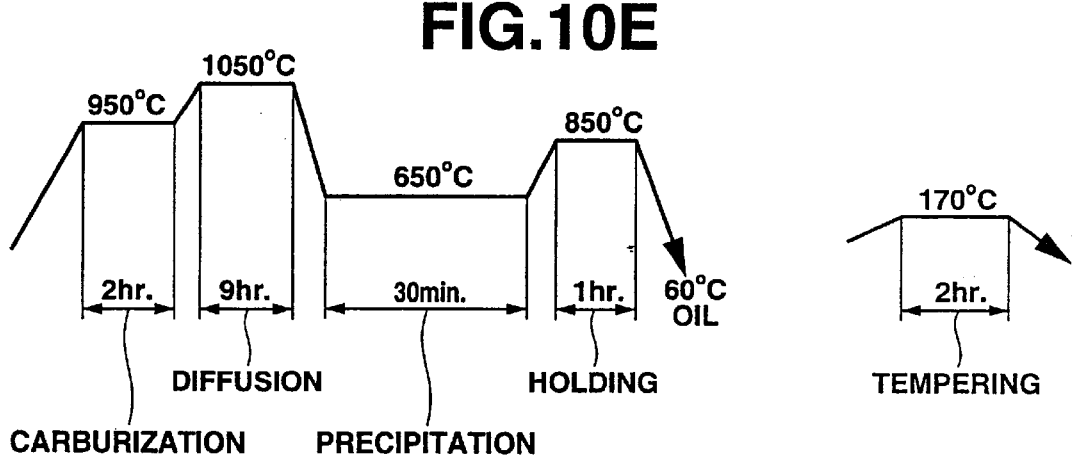
FIGS. 10E to 10G are graphical representations of heat treatment conditions applied in embodiments of the present invention.
Figure 10F:
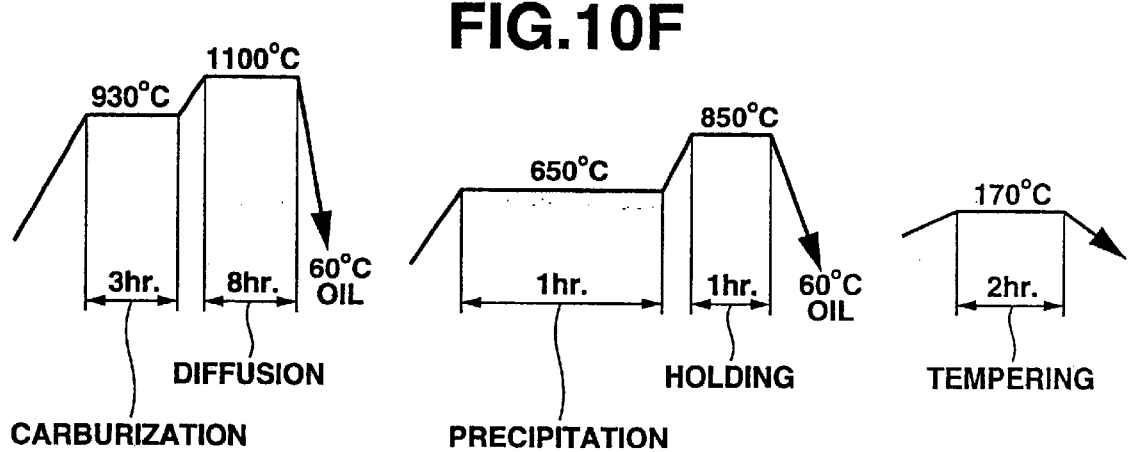
Figure 10G:
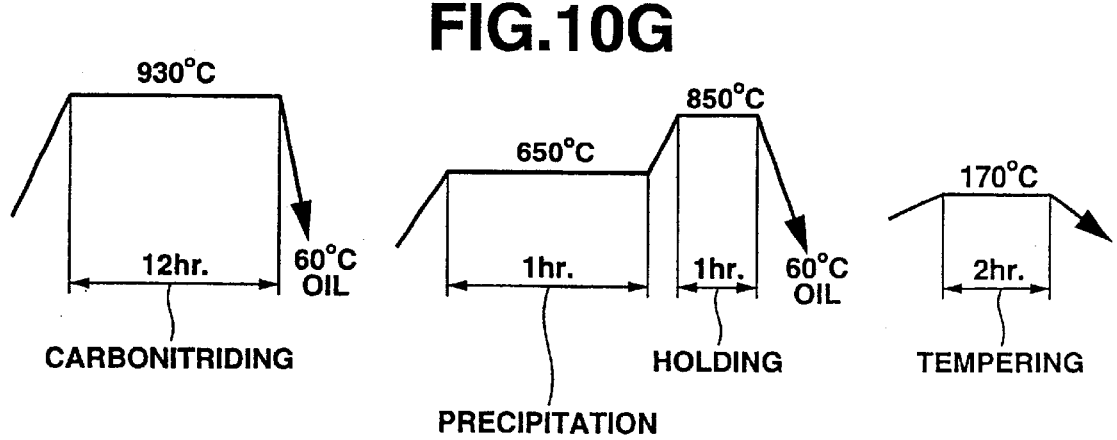

| Classification | Type of Steel | Heat treatment conditions | Surface carbon density (wt %) | Carbon density at depth of max. shearing stress (wt %) | Base material structure (wt %) | Precipitate structure |
|---|---|---|---|---|---|---|
| Invention example 31 | 1A | FIG. 9A | 1.0 | 0.6 | Martensite | $M_{23}C_6$ |
| Invention example 32 | 1C | FIG. 9C | 1.0 | 1.0 | Martensite | $M_{23}C_6$ |
| Invention example 33 | 1D | FIG. 9D | 0.6 | 0.6 | Martensite | $M_{23}C_6$ |
| Invention example 34 | 1A | FIG. 10E | 1.1 | 0.7 | Martensite | $M_{23}C_6$ |
| Invention example 35 | 1A | FIG. 10F | 1.1 | 0.5 | Martensite | $M_{23}C_6$ |
| Invention example 36 | 1A | FIG. 10G | 1.0 | 0.6 | Martensite | $M_{23}C_6$ |
| Invention example 37 | 1E | FIG. 9C | 0.4 | 0.4 | Martensite | $M_{23}C_6$ |
| Comparative example 21 | 1B | FIG. 9B | 1.1 | 0.7 | Martensite | $M_3C$ |
| Comparative example 22 | 1F | FIG. 9C | 1.8 | 1.8 | Martensite | $M_{23}C_6 + M_3C$ |

TABLE 11

| Classification | Precipitate mean particle size (μm) | Carbon surface area ratio in 2nd phase (%) | Surface area ratio of 2nd phase (%) | Thrust test life (L50) (times) | Roller pitting life (times) |
|---|---|---|---|---|---|
| Invention example 31 | 0.25 | 15.8 | 81 | $8.8 \times 10^7$ | Surpassed $10^7$ |
| Invention example 32 | 0.17 | 17.9 | 52 | $8.1 \times 10^7$ | Surpassed $10^7$ |

TABLE 11-continued

| Classi-fication | Precipitate mean particle size (μm) | Carbon surface area ratio in 2nd phase (%) | Surface area ratio of 2nd phase (%) | Thrust test life (L50) (times) | Roller pitting life (times) |
| --- | --- | --- | --- | --- | --- |
| Invention example 33 | 0.18 | 12.4 | 22 | $7.2 \times 10^7$ | Surpassed $10^7$ |
| Invention example 34 | 0.16 | 23.1 | 35 | $7.9 \times 10^7$ | Surpassed $10^7$ |
| Invention example 35 | 0.19 | 18.8 | 23 | $8.9 \times 10^7$ | Surpassed $10^7$ |
| Invention example 36 | 0.20 | 20.1 | 19 | $9.1 \times 10^7$ | Surpassed $10^7$ |
| Invention example 37 | 0.19 | 2.0 | 2 | $5.3 \times 10^6$ | Surpassed $10^7$ |
| Comparative example 21 | 3.80 | — | 0 | $2.1 \times 10^7$ | Surpassed $10^7$ |
| Comparative example 22 | 4.20 | 22.2 | 55 | $3.4 \times 10^6$ | Surpassed $10^7$ |

As is clear from the results shown in Tables 10 and 11, after performing carburization treatment on the Cr-content steel so that the surface carbon density is within the prescribed range, namely 0.6 to 1.5%, with respect to the test piece (high bearing pressure member) of invention example 31, and not performing carburization treatment on steel containing the prescribed contents of Cr and C with respect to the test pieces of invention examples 32 and 33, carbide was precipitated by holding at a temperature having for its upper limit temperature T (° C.) calculated based on equation T, and after holding at the austenite region temperature of 850° C., quenching and tempering were performed, as a result of which a biphasic structure was formed in which a second phase was formed at a range of from 20 to 80% wherein microscopic $M_{23}C_6$-type carbide having a mean particle size of 0.3 μm or less was precipitated at a surface area ratio of about 10 to 20%, and both pitting life and rolling fatigue life were confirmed to be drastically improved.

Furthermore, under the heat treatment conditions shown in FIG. 9D applied to invention example 33, there was no carbide precipitation step observed in which the temperature is temporarily held at a low temperature following carburization treatment in comparison with other heat treatment conditions. However, in invention example 33, since the steel type of symbol 1D shown in Table 9 was used for the raw material steel, upper limit temperature T for carbide precipitation as calculated from equation T was high at 1062.9° C. Consequently, $M_{23}C_6$-type carbide (with some $M_3C$-type carbide) was finely precipitated during the time the temperature was held at the austenite temperature of 850° C. for quenching, allowing the obtaining of excellent cold hardness and temper softening resistance as well as satisfactory pitting life and rolling fatigue life. In other words, in the heat treatment in invention example 4, the carbide precipitation step during which the temperature is held at a temperature having for its upper limit temperature T was performed while overlapping with the quenching temperature of 850° C.

In addition, in invention example 34, since carburization treatment was performed under conditions such that the ratio (Td/Tc) of diffusion temperature Td (° C.) to carburization temperature Tc (° C.) was 1.1 followed by temporarily moving to a cooled room to be subjected to gas cooling (cooling rate: 80° C./min.), grain border reticular carbide was not precipitated on the rolling surface and a structure was formed in which $M_{23}C_6$-type carbide was finely dispersed, resulting in the obtaining of stable pitting strength and rolling fatigue strength. In invention example 35, after performing carburization treatment under conditions such that the Td/Tc ratio was 1.18 followed by temporarily quenching in oil at 60° C. (cooling rate: 2000° C./min.) and precipitating carbide for 5 hours at 650° C., the temperature was raised to the austenite region temperature of 850° C. followed by quenching and tempering. As a result, a structure was obtained that was similar to the case of the above invention example 34 in which carburization and diffusion were followed by gas cooling, and stable pitting strength and rolling fatigue strength were similarly obtained.

In addition, in invention example 36, carbonitriding was performed by introducing ammonia gas into the furnace during carburization, and after temporarily quenching in oil at 60° C., precipitation treatment, quenching and tempering were performed in a similar manner. As a result, it was demonstrated that there was similarly no precipitation of grain boundary reticular carbide on the rolling surface, a structure is obtained in which $M_{23}C_6$-type carbide was finely dispersed, and that stable pitting strength and rolling fatigue strength are obtained.

Embodiment 5

Forging followed by rough machining were performed on steels 1A, 1B and 1F of steels shown in Table 9 so as to shape input and output discs 13, 14 and inner and outer rings 16 and 17 of power roller 15 for the toroidal continuously variable transmission as shown in FIG. 7, and FIG. 8A and 8B. Thereafter, heat treatment was performed the forged and roughly machined steels under the conditions shown in FIGS. 9A through 10G. Shot-peening was performed at the rectangular portion of the inner diameter hole at the apex of the disks (portion F in FIG. 8B) and at the rectangular portion of the inner diameter hole in the bearing groove of power roller inner ring 16 (portion D in FIG. 8A) together with grinding ultra-finishing at those portions other than the sites at which shot-peening was performed.

Next, these input and output discs 13 and 14 along with inner and outer rings 16 and 17 of power roller 15 were combined, and an endurance test was performed using the toroidal continuously variable transmission box shown in FIG. 7 to evaluate the bending fatigue strength of discs 13 and 14 and power roller inner ring 16 according to the service life (bending fatigue life) until separation or cracking was made. Additionally, the rolling fatigue life of discs 13 and 14 and power roller inner ring 16 was derived from the test results of the above-discussed rolling fatigue test.

As a result, as shown in Table 12, the rolling elements in invention examples 38, 39 and 40 (these respectively coincide with the combinations of steel types and heat treatment conditions of invention examples 31, 34 and 36 in Embodiment 4) had a structure in which $M_{23}C_6$-type carbide was precipitated. Consequently, since the temper hardness at the rolling contact surface is high, there is resistance to plastic deformation even at high contact bearing pressures. In addition, since there is high temper hardness even at the location of the depth of maximum shearing stress, there is little susceptibility to the occurrence of structural changes caused by rolling fatigue, thereby resulting in long life.

On the other hand, in the rolling elements pertaining to comparative examples 23 and 24 (these coincide with the combinations of steel types and heat treatment conditions of comparative examples 31 and 32 in Embodiment 4), since $M_{23}C_6$-type carbide is not precipitated, there is increased susceptibility to plastic deformation at high contact bearing pressures, and separation was confirmed to occur easily.

TABLE 12

| Classification | Type of Steel | Heat treatment conditions | Site (FIGS. 8A,8B) | 2nd phase surface area ratio | Shot-peening | Endurance testing Rolling fatigue life | Endurance testing Bending fatigue life |
|---|---|---|---|---|---|---|---|
| Inv. Ex. 38 (Inv. Ex. 31) | 1A | FIG. 9A | A | 81 | No | ⊚ | — |
| | | | B | 73 | No | ⊚ | — |
| | | | C | 64 | No | ⊚ | — |
| | | | D | 20 | Yes | — | ○ |
| | | | E | 78 | No | ⊚ | — |
| | | | F | 15 | Yes | — | ○ |
| Inv. Ex. 39 (Inv. Ex. 34) | 1A | FIG. 10C | A | 52 | No | ⊚ | — |
| | | | B | 49 | No | ⊚ | — |
| | | | C | 42 | No | ⊚ | — |
| | | | D | 12 | Yes | — | ○ |
| | | | E | 45 | No | ⊚ | — |
| | | | F | 8 | Yes | — | ○ |
| Inv. Ex. 40 (Inv. Ex. 36) | 1A | FIG. 10G | A | 22 | No | ⊚ | — |
| | | | B | 15 | No | ⊚ | — |
| | | | C | 13 | No | ⊚ | — |
| | | | D | 8 | Yes | — | ○ |
| | | | E | 16 | No | ⊚ | — |
| | | | F | 3 | Yes | — | ○ |
| Comp. Ex. 23 (Comp. Ex. 31) | 1B | FIG. 9B | A | 0 | No | ○ | — |
| | | | B | 0 | No | ○ | — |
| | | | C | 0 | No | ○ | — |
| | | | D | 0 | Yes | — | ○ |
| | | | E | 0 | No | ○ | — |
| | | | F | 0 | Yes | — | ○ |
| Comp. Ex. 24 (Comp. Ex. 32) | 1C | FIG. 9C | A | 55 | No | ○ | — |
| | | | B | 38 | No | ○ | — |
| | | | C | 34 | No | ○ | — |
| | | | D | 16 | Yes | — | Δ |
| | | | E | 39 | No | ○ | — |
| | | | F | 11 | Yes | — | Δ |

Note) ⊚ indicates excellent evaluation; ○ indicates better evaluation; and Δ indicates good evaluation.

Embodiment 6

After performing lathe turning and gear cutting using steels 1A, 1B and 1F shown in Table 9 in the same manner as Embodiment 5, heat treatment was performed on each steel by combining with the same conditions as Embodiment 5 followed by shot-peening and grinding to obtain the gears having the specifications shown in Table 7.

An anti-pitting test was then performed using a power circulating type of gear pitting tester based on the conditions of a Hertz bearing pressure at the gear pitting point of 2.0 GPa, test gear rotating speed of 1000 rpm, automatic transmission fluid for the oil type and an oil temperature of 120° C. Pitting life was evaluated in terms of the total number of rotations until the surface area of separation caused by pitting that occurred on the tooth surfaces of the test gear reached a surface area equivalent to 3% of the effective meshing surf ace area of the entire gear.

As a result, as shown in Table 13, in the gears produced according to invention examples 41, 42 and 43 (equivalent to the combinations of invention examples 31, 34 and 36 in Embodiment 4), since $M_{23}C_6$-type carbide was finely dispersed and high hardness was maintained even after tempering, pitting life improved considerably. On the other hand, in the case of the gears produced according to comparative examples 25 and 26 (equivalent to the combinations of comparative examples 31 and 32 in Embodiment 4), since the structure did not contain precipitation of $M_{23}C_6$-type carbide, temper hardness was low and pitting occurred easily.

TABLE 13

| Classification | Type of Steel | Heat Treatment | Arc Height | Pitting Life |
|---|---|---|---|---|
| Invention example 41 (Invention example 31) | 1A | FIG. 9A | 0.95 | Surpassed $1 \times 10^7$ times |
| Invention example 42 (Invention example 34) | 1A | FIG. 10E | 0.94 | Surpassed $1 \times 10^7$ times |
| Invention example 43 (Invention example 36) | 1A | FIG. 10G | 1.12 | Surpassed $1 \times 10^7$ times |
| Comparative example 25 (Comp. Example 31) | 1B | FIG. 9B | 0.91 | $4.4 \times 10^6$ times |
| Comparative example 26 (Comp. Example 32) | 1F | FIG. 9C | 0.97 | $0.8 \times 10^6$ times |

Note) Arc height indicates intensity of shot-peening and corresponds to height of warp of thin sheet under shot-peening.

The entire contents of Japanese Patent Applications P11-206552 (filed Jul. 21, 1999) and P-11-208958 (filed Jul. 23, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A pressure-resistant member comprising
   a mechanical structural steel containing Cr and Mo, said mechanical structural steel including a matrix having at least one of martensite structure and bainite structure, said matrix containing carbide having a mean particle size of 3 μm or less, dispersed and precipitated in form of at least one of sphere and pseudo-sphere, said carbide including $M_{23}C_6$ carbide.

2. A pressure-resistant member as claimed in claim 1, said mechanical structural steel includes a first phase region having at least one of martensite structure and bainite structure, and a second phase region including a matrix having at least one of martensite structure and bainite structure, said matrix containing carbide having a mean particle size of 3 μm or less, dispersed and precipitated in form of at least one of sphere and pseudo-sphere.

3. A pressure-resistant member as claimed in claim 2, wherein said second phase region includes carbide which contains $M_{23}C_6$ carbide containing at least Cr, dispersed and precipitated in the second phase region.

4. A pressure-resistant member as claimed in claim 2, wherein a surface area ratio of the second phase region at a site subjected to rolling fatigue due to rolling contact and sensitive to a surface origin separation is within a range of from 3 to 100% at a uppermost surface of said mechanical structural steel.

5. A pressure-resistant member as claimed in claim 2, wherein a surface area ratio of the second phase region at a site subjected to rolling fatigue due to rolling contact and sensitive to a surface origin separation is within a range of from 50 to 80% at a uppermost surface of said mechanical structural steel.

6. A pressure-resistant member as claimed in claim 2, wherein a surface area ratio of the second phase region at a site subjected to bending fatigue by a repetitive load of bending stress is 90% or less at a uppermost surface of said mechanical structural steel, wherein shot-peening is performed at the uppermost surface.

7. A pressure-resistant member as claimed in claim 6, wherein the surface area ratio of the second phase region at the site subjected to bending fatigue by a repetitive load of bending stress is 30% or less at the uppermost surface of said member, wherein shot-peening is performed at the uppermost surface.

8. A pressure-resistant member as claimed in claim 2, wherein a surface area of the second phase at the site subjected to rolling fatigue by a repetitive load of shearing stress caused by rolling contact is 3% or more at a surface layer extending from a surface of said material member to a depth location where a maximum shearing stress occurs.

9. A pressure-resistant member as set forth in claim 8, wherein the surface area ratio of the second phase at the site subjected to rolling fatigue by a repetitive load of shearing stress caused by rolling contact is 50% or more at the surface layer extending from the surface of said material member to the depth location where the maximum shearing stress occurs.

10. A pressure-resistant member as claimed in claim 3, S is contained in an amount of 0.01% by weight or less relative to weight of said mechanical structural steel.

11. A pressure-resistant member as claimed in claim 3, wherein said carbide is dispersed and precipitated at a surface area ratio ranging from 0.3 to 30% in the second phase region.

12. A pressure-resistant member as claimed in claim 10, wherein nitrogen is contained in solid solution in an amount ranging from 0.01 to 0.5% by weight relative to weight of said material member, at at least a location from a surface of said pressure-resistant member formed before grinding to a surface of said pressure-resistant member formed after grinding.

13. A pressure-resistant member as claimed in claim 2, wherein said mechanical structural steel contains Cr in an amount ranging from 1.2 to 3.2% by weight and Mo in an amount ranging from 0.25 to 2.0% by weight.

14. A pressure-resistant member as claimed in claim 13, wherein nitrogen is contained in solid solution in an amount ranging from 0.01 to 0.5% by weight relative to weight of said pressure-resistant member, at at least a location from a surface of said member formed before grinding to a surface of said pressure-resistant member formed after grinding.

15. A pressure-resistant member as claimed in claim 13, wherein sulfur is contained in an amount of not more than 0.01% by weight relative to weight of said mechanical structural steel.

16. A pressure-resistant member as claimed in claim 2, wherein said carbide at least at a cross-sectional surface of said mechanical structural steel located at a depth of the occurrence of maximum shearing stress caused by rolling contact is dispersed and precipitated in a surface area ratio ranging from 0.3 to 30%.

17. A pressure-resistant member as claimed in claim 16, wherein said steel has a surface carbon density at a site subjected to rolling fatigue caused by rolling contact, within a range of from 0.6 to 1.5% by weight.

18. A pressure-resistant member as claimed in claim 2, wherein a carbon density at a site subjected to rolling fatigue by a repetitive load of shearing stress caused by rolling contact is 0.5% by weight or more.

19. A pressure-resistant member as claimed in claim 2, wherein said member is a rolling element forming part of a toroidal continuously variable transmission.

* * * * *